(12) United States Patent
Tamura

(10) Patent No.: US 9,313,049 B2
(45) Date of Patent: Apr. 12, 2016

(54) COMMUNICATION SYSTEM, NETWORK APPARATUS, GATEWAY APPARATUS, COMPUTER PROGRAM, DATA TRANSMISSION METHOD AND DATA TRANSFER METHOD

(75) Inventor: Yoshio Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 870 days.

(21) Appl. No.: 13/428,532

(22) Filed: Mar. 23, 2012

(65) Prior Publication Data

US 2012/0300778 A1     Nov. 29, 2012

(30) Foreign Application Priority Data

May 25, 2011   (JP) .................................. 2011-117267

(51) Int. Cl.
*H04L 12/66*     (2006.01)
(52) U.S. Cl.
CPC ...................................... *H04L 12/66* (2013.01)
(58) Field of Classification Search
CPC ... H04W 80/04; H04L 47/34; H04L 29/0653; H04L 12/66; H04L 12/56
USPC .................. 370/474, 476, 477, 392, 329, 401
See application file for complete search history.

(56) References Cited

U.S. PATENT DOCUMENTS

| | | | |
|---|---|---|---|
| 8,072,933 B2* | 12/2011 | Marinescu et al. | 370/331 |
| 2004/0258092 A1* | 12/2004 | Sugaya | 370/474 |
| 2009/0103504 A1 | 4/2009 | Inumaru | |
| 2009/0238115 A1* | 9/2009 | Yamane | 370/328 |
| 2010/0075659 A1* | 3/2010 | Kim et al. | 455/422.1 |

FOREIGN PATENT DOCUMENTS

| | | |
|---|---|---|
| JP | 2005-064604 | 3/2005 |
| JP | 2006-295454 | 10/2006 |
| JP | 2009-105607 | 5/2009 |

OTHER PUBLICATIONS

JPOA—Office Action of Japanese Patent Application No. 2011-117267 dated Nov. 11, 2014, with English Translation of the Office Action.

* cited by examiner

*Primary Examiner* — Kwang B Yao
*Assistant Examiner* — Hien Nguyen
(74) *Attorney, Agent, or Firm* — Fujitsu Patent Center

(57) ABSTRACT

A network apparatus, wherein a bearer is set between the network apparatus and a gateway apparatus connects a radio access network and a core network, including: a tunneling processing unit that encapsulates user data in accordance with a tunneling protocol; a data combining unit that generates combined data in which a plurality of the encapsulated user data to be transmitted to the same the gateway apparatus are combined; a header generation unit that generates a header of the network protocol storing the bearer identifier of the bearer transmitting user data included in the combined data; and a transmission unit that transmits a packet of the combined data having the header added thereto to the gateway apparatus.

11 Claims, 27 Drawing Sheets

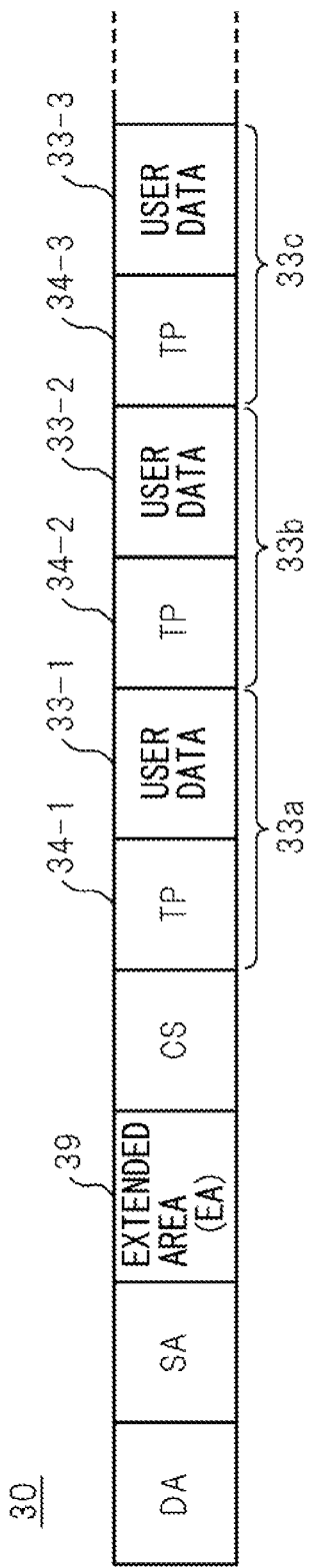

FIG.8

| TYPE | DATA LENGTH | NUMBER OF USER DATA=3 | | |
|---|---|---|---|---|
| DATA LENGTH[1]=128 | DATA LENGTH[2]=150 | DATA LENGTH[3]=200 | | |
| BI[1]=1 | | | | |
| BI[2]=2 | | | | |
| BI[3]=3 | | | | |

30: DA ad50 | SA ad20 | EA | CS | TP10 (BI=1) | DATA 10 | TP11 (BI=2) | DATA 11 | TP12 (BI=3) | DATA 12

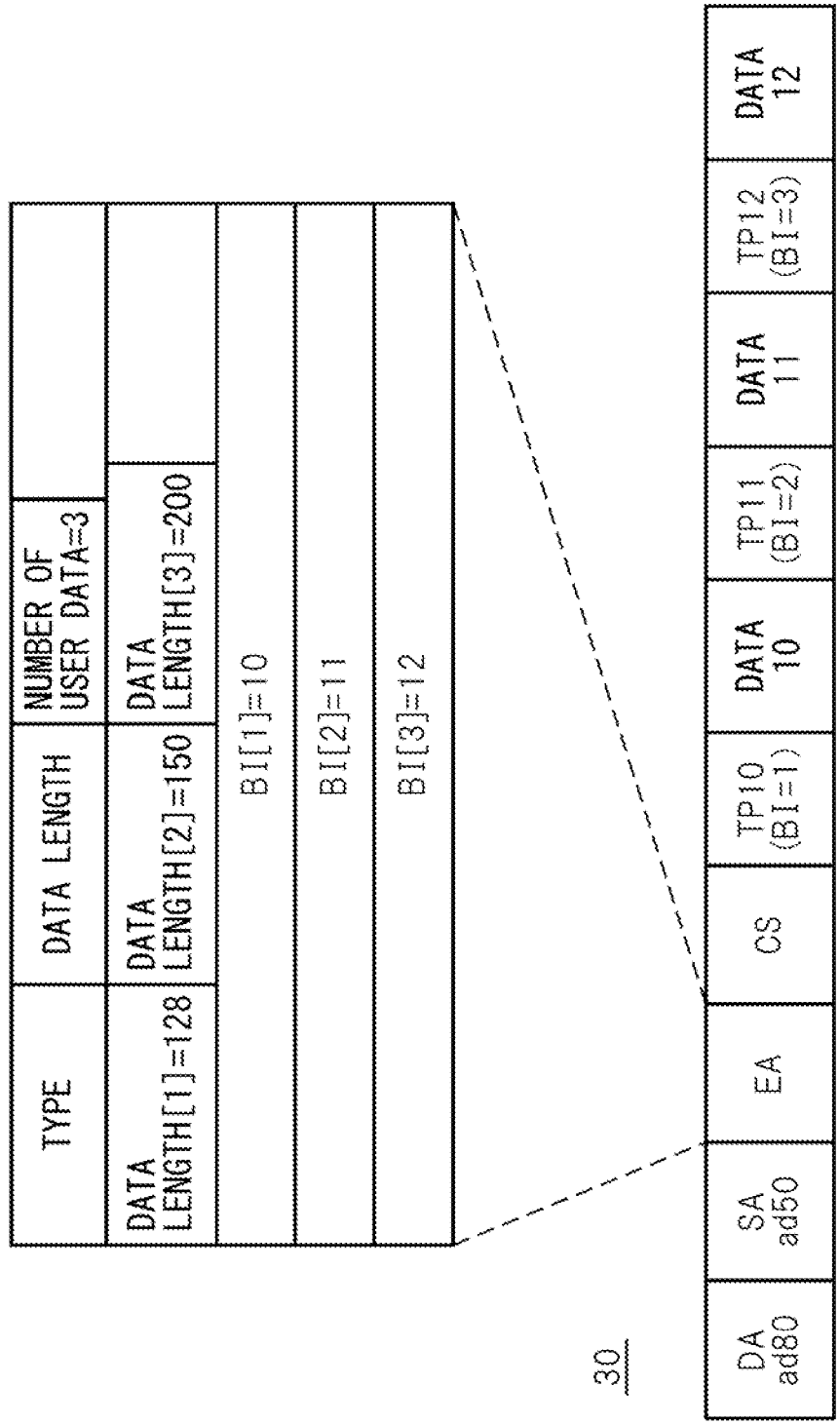

FIG.14

| DA ad80 | SA ad50 | EA | CS | TP10 (BI=1) | DATA 10 | TP11 (BI=2) | DATA 11 | TP12 (BI=3) | DATA 12 | TP13 (BI=4) | DATA 13 | TP14 (BI=5) | DATA 14 |

| TYPE | DATA LENGTH | NUMBER OF USER DATA=5 | | |
|---|---|---|---|---|
| USER DATA LENGTH[1]=128 | USER DATA LENGTH[2]=150 | USER DATA LENGTH[3]=200 | USER DATA LENGTH[4]=100 | |
| USER DATA LENGTH[5]=128 | | | | |
| BI[1]=10 | | | | |
| BI[2]=11 | | | | |
| BI[3]=12 | | | | |
| BI[4]=13 | | | | |
| BI[5]=14 | | | | |

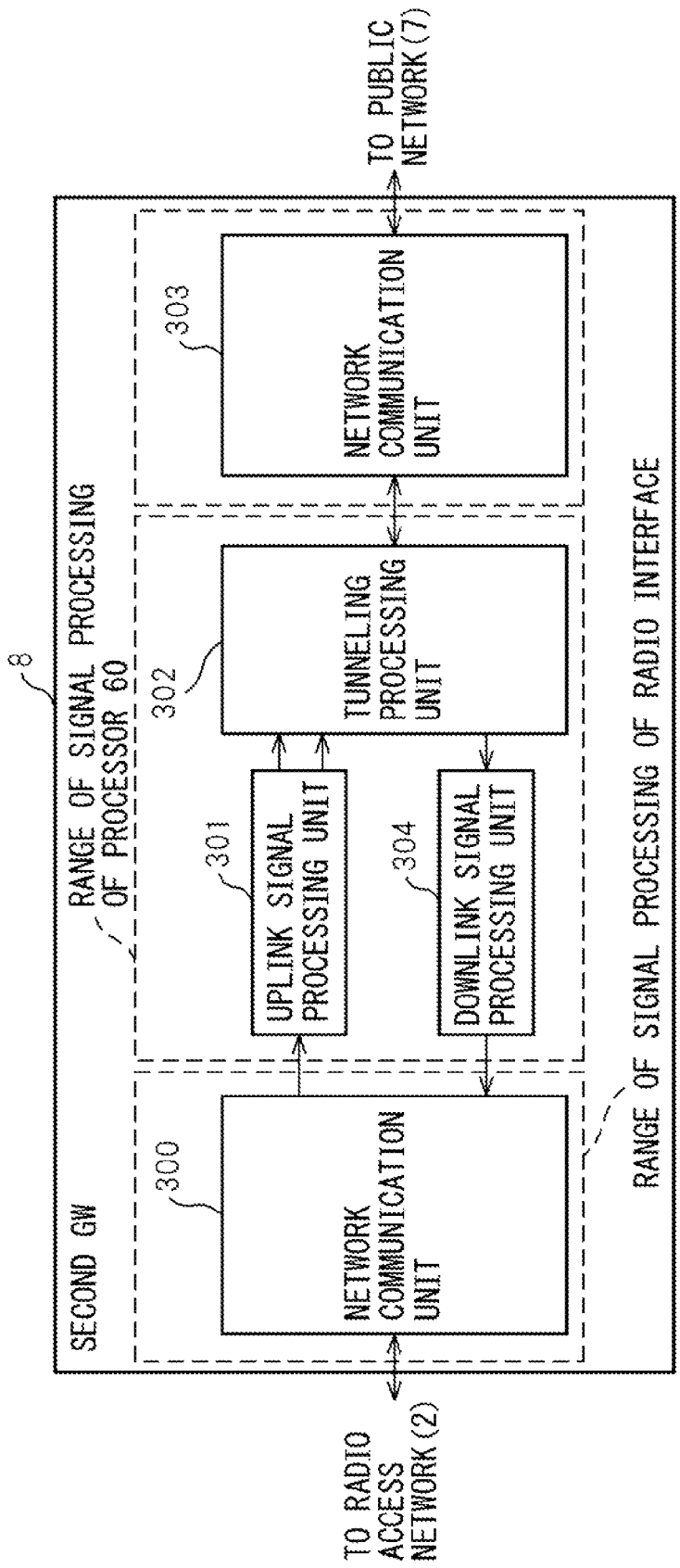

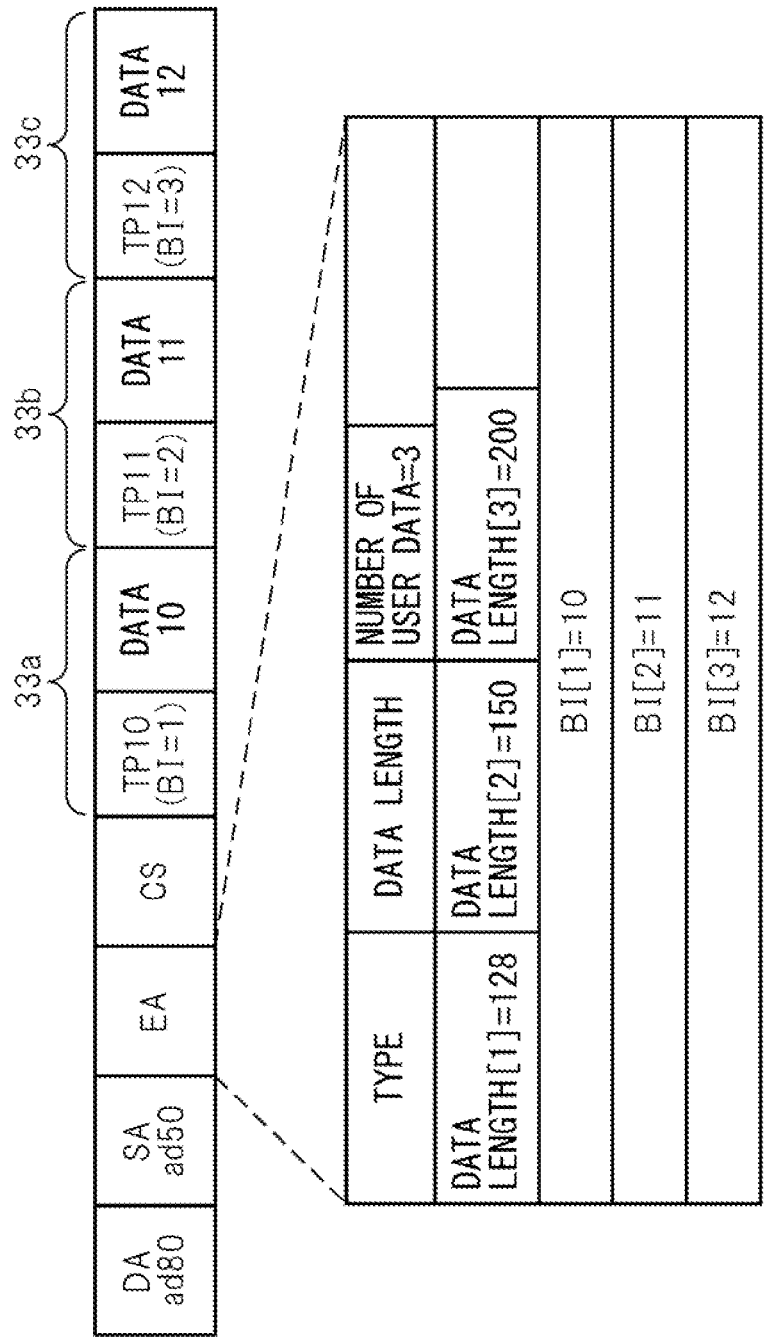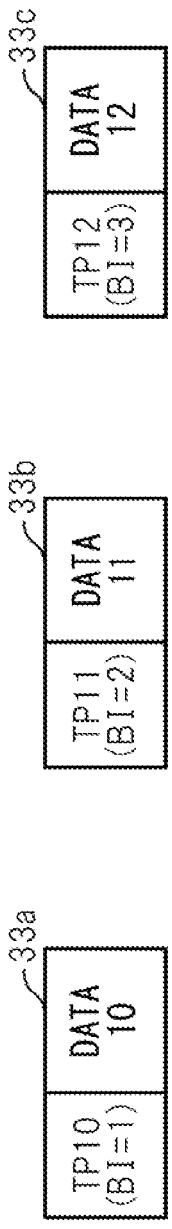

FIG.23

| DA ad50 | SA ad80 | EA | CS | TP110 (BI=21) | DATA 110 | TP111 (BI=22) | DATA 111 | TP114 (BI=25) | DATA 114 |

30-2

| TYPE | DATA LENGTH | NUMBER OF USER DATA=3 | | |
|---|---|---|---|---|
| DATA LENGTH[1]=130 | DATA LENGTH[2]=128 | DATA LENGTH[3]=184 | | |
| BI[1]=21 | | | | |
| BI[2]=22 | | | | |
| BI[3]=25 | | | | |

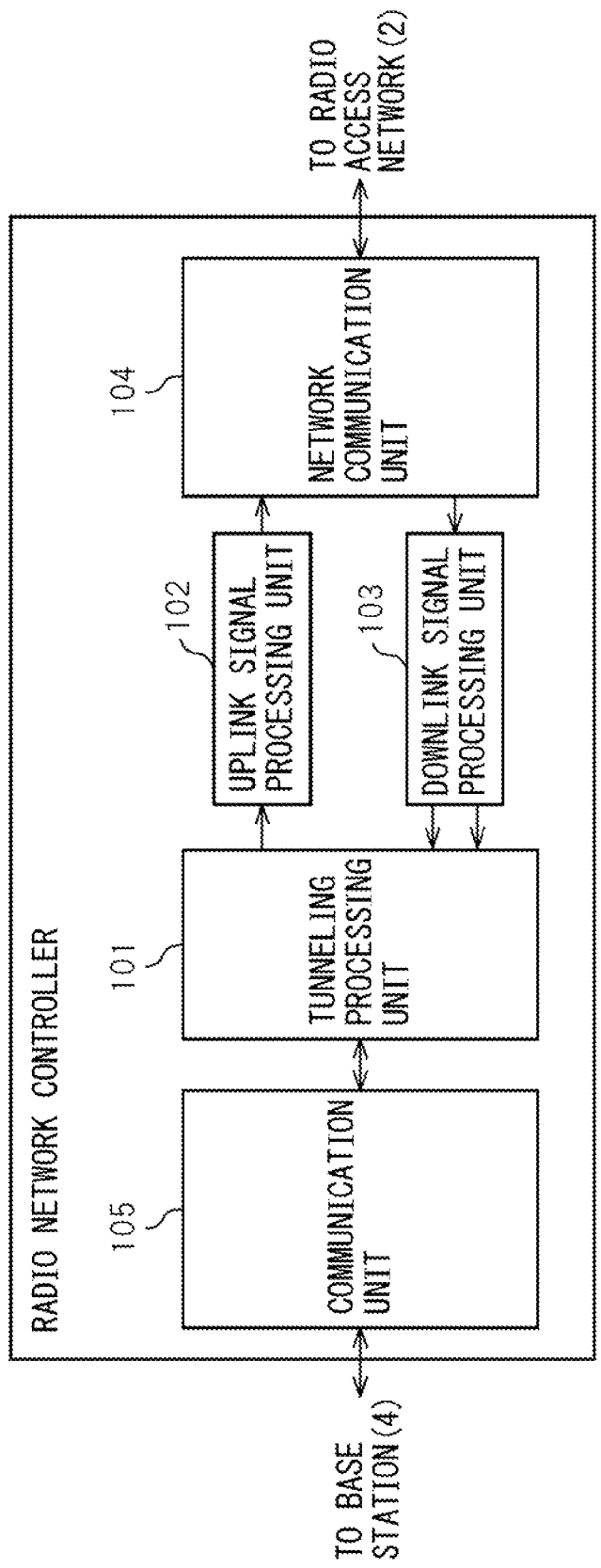

COMMUNICATION SYSTEM, NETWORK APPARATUS, GATEWAY APPARATUS, COMPUTER PROGRAM, DATA TRANSMISSION METHOD AND DATA TRANSFER METHOD

CROSS-REFERENCE TO RELATED APPLICATIONS

This application is based upon and claims the benefit of priority of the prior Japanese Patent Application No. 2011-117267, filed on May 25, 2011, the entire contents of which are incorporated herein by reference.

FIELD

Embodiments described in the present specification relate to a transmission technology for transmitting user data in a mobile packet communication network.

BACKGROUND

A mobile station apparatus may sometimes transmit a packet of relatively short packet length. Such a packet may include, for example, a packet of not longer than about 128 bytes, and is referred to as "short packet". When short packets are executed consecutively, the frequency of packet processing becomes too high because of processing of headers of packets. Thus, when short packets are consecutively executed, packet processing load per unit time becomes larger than when long packets are consecutively executed. Therefore, as the number of short packets flowing in a mobile communication network increases, larger processing capacity is required for router apparatuses and server apparatuses which execute packet processing.

A network system has been known in which, when first packets are transmitted from built-in apparatuses toward a server, respectively, two first packets are integrated into one second packet by packet processing means in the relay device, and the second packet is transmitted to the entire computer network. When the server receives the second packet, the server detects that the second packet has been addressed to it, and after the second packet is divided into the two first packets by packet processing means, the first packets are subjected to data processing by data processing means.

SUMMARY

According to an aspect of the apparatus, a communication system including a gateway apparatus connecting a first network and a second network in which user data are transmitted by a network protocol, a first network apparatus in the first network in which a first bearer to the gateway apparatus is set for each mobile station apparatus for transmitting user data on a tunneling protocol in higher layer than the network protocol, and a second network apparatus in the second network in which a second bearer to the gateway apparatus is set for each mobile station apparatus for transmitting user data on the tunneling protocol is provided.

The first network apparatus includes a first tunneling processing unit that encapsulates user data in accordance with tunneling protocol, a data combining unit that generates combined data by combining a plurality of encapsulated user data to be transmitted to same gateway apparatus, a header generating unit that generates a header of the network protocol which stores a bearer identifier of a first bearer transmitting the user data included in the combined data, and designates the gateway apparatus as the destination, and a first transmission unit that transmits the packet of the combined data having the header added thereto.

The gateway apparatus includes a reception unit that receives, via the first network, a packet of the encapsulated combined data in which a plurality of user data are encapsulated in accordance with the tunneling protocol having a header of the network protocol added thereto that stores a header identifier of the first bearer transmitting user data included in the combined data, an acquisition unit that acquires the bearer identifier of the first bearer, a tunneling processing unit that identifies a second network apparatus and specifies an identifier of a second bearer transmitting the user data based on the source information and the bearer identifier of the first bearer of the packet, a packet regenerating unit that regenerates a packet of combined data in which a plurality of encapsulated user data are combined and to which a header of the network protocol storing an bearer identifier of a second bearer transmitting the user data included in the combined data and designating the second network apparatus as the destination is added, and a second transmission unit that transmits the packet regenerated by the packet regenerating unit to the second network.

According to an aspect of the computer program, a computer program for operating a computer as a network apparatus in a first network, a gateway apparatus connecting the first network and a second network in which user data are transmitted by a network protocol, wherein a bearer is set for each mobile station apparatus for transmitting user data by a tunneling protocol in higher layer than a network protocol to and from the gateway apparatus is provided.

The computer program causes the computer to execute processing of: encapsulating user data by a tunneling protocol; generating combined data by combining a plurality of encapsulated data to be transmitted to the same gateway apparatus; generating a header storing the bearer identifier of the bearer transmitting user data included in the combined data, and transmitting a packet of the combined data having the header added thereto to the gateway apparatus.

According to another aspect of the computer program, a computer program for operating a computer as a gateway apparatus connecting a first network and a second network in which user data are transmitted by a network protocol, wherein a first bearer is set for each mobile station apparatus for transmitting user data by tunneling protocol in higher layer than the network protocol to and from a first network apparatus in the first network, and a second bearer is set for each mobile station apparatus for transmitting user data by the tunneling protocol to and from a second network apparatus in the second network is provided.

The computer program causes the computer to execute processing of; receiving, via the first network, a packet of combined data in which a plurality of encapsulated user data encapsulated by the tunneling protocol are combined and to which a header of the network protocol storing the bearer identifier of the first bearer that transmits the user data included in the combined data is added; acquiring the bearer identifier of the first bearer from the header; identifying the second network apparatus based on the source information of the packet and the bearer identifier of the first bearer; specifying an identifier of the second bearer that transmits the user data based on the source information of the packet and the bearer identifier of the first bearer; regenerating a packet of combined data in which a plurality of encapsulated user data are combined and to which a header of the network protocol storing a bearer identifier of the second bearer that transmits the user data included in the combined data is added; and transmitting the regenerated packet to the second network apparatus.

According to an aspect of the method, a data transmission method for transmitting user data between a gateway apparatus connecting a first network and a second network in which user data are transmitted by a network protocol, and a network apparatus in the first network via a bearer set for each mobile station apparatus by a tunneling protocol in higher layer than the network protocol is provided.

The data transmission method includes: encapsulating user data in accordance with the tunneling protocol, generating combined data in which a plurality of encapsulated user data to be transmitted to the same gateway apparatus are combined, generating a header of the network protocol storing the bearer identifier of the bearer transmitting user data included in the combine data, and transmitting a packet of the combined data having the header added thereto from the first network apparatus to the gateway apparatus.

According to an aspect of the method, a data transfer method, in a system comprising a gateway apparatus connecting a first network and a second network in which user data are transmitted by a network protocol, for transferring user data from the first bearer that is set for each mobile station apparatus between the gateway apparatus and a first network apparatus in the first network by a tunneling protocol in higher layer than the network protocol, to the second bearer that is set for each mobile station apparatus by the tunneling protocol between the gateway apparatus and a second network apparatus in the second network is provided.

The data transfer method includes receiving via the first network a packet of combined data in which a plurality of encapsulated user data encapsulated in accordance with the tunneling protocol are combined and to which a header of the network protocol storing the bearer identifier of the first bearer that transmits user data included in the combined data is added; acquiring the bearer identifier of the first bearer from the header; identifying a second network apparatus based on the source information and the bearer identifier of the first bearer; specifying an identifier of the second bearer that transmits user data based on the source information and the bearer identifier of the first bearer; regenerating a packet of combined data in which a plurality of encapsulated user data are combined and to which a header of the network protocol storing a bearer identifier of the second bearer that transmits the user data included in the combined data is added; and transmitting the regenerated packet from the gateway apparatus to the second network apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 7A is a schematic view depicting the data format of a packet generated by the combining unit;

FIG. 7B is a view depicting an example of data format of an extended area;

FIG. 8 is a view depicting an example of a packet generated by the combining unit;

FIG. 12 is a view depicting the result of the changing of header by the packet regeneration unit;

FIG. 14 is a view (Part 2) for illustrating combining of packets by the packet regeneration unit;

FIG. 18A is a view depicting an exemplary construction of the second gateway apparatus;

FIG. 19A is a view for illustrating a first example of separation processing of a packet by the separation unit;

FIG. 19B is a view for illustrating a first example of separation processing of a packet by the separation unit;

FIG. 23 is a view depicting an example of a packet generated by the second gateway apparatus in a downlink;

FIG. 26 is a view depicting an exemplary construction of a radio network controller.

DESCRIPTION OF EMBODIMENTS

<1. Construction of Communication System>

Figure 1:
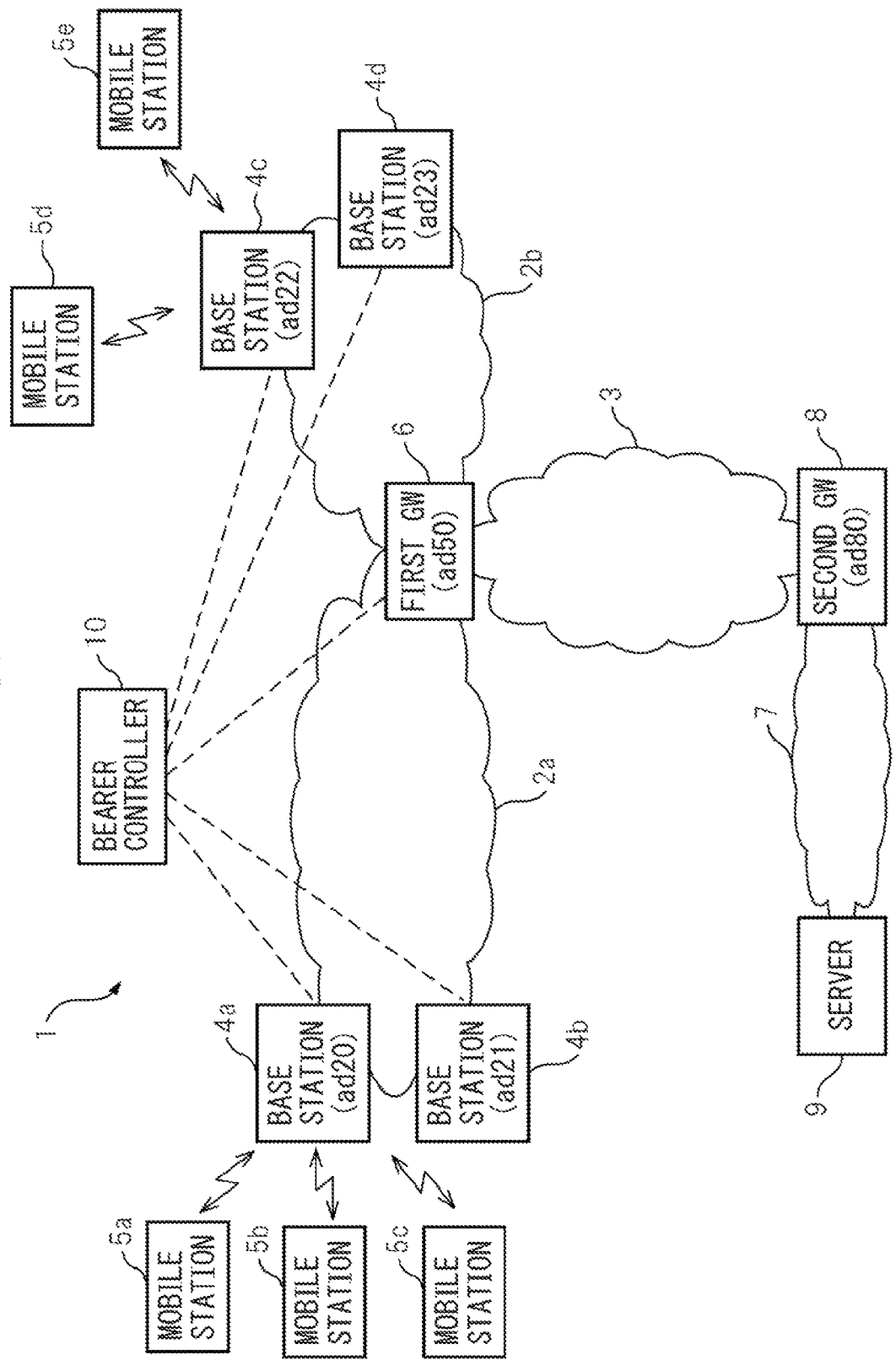
FIG. 1 is a view depicting example of the overall construction of the communication system.

Embodiments of the present invention will be described below with reference to appended drawings. FIG. 1 is a view depicting the exemplary overall construction of the communication system. The communication system 1 includes radio access networks 2a, 2b and a core network 3. The radio access network 2a includes base station apparatuses 4a and 4b. The radio access network 2b includes base station apparatuses 4c and 4d. In the description that follows, it is understood that mobile station apparatuses 5a~5c are connected to the base station 4a, and mobile station apparatuses 5d and 5e are connected to the base station 4c.

The communication system 1 includes a first gateway apparatus 6 connected to the radio access networks 2b and 2c and to the core network 3. The communication system 1 includes a second gateway apparatus 8 connected to the core network 3 and to a public network 7. When user data are transmitted between the mobile station apparatuses 5a~5e and an external server apparatus 9, a packet flows via the second gateway apparatus 8 to the public network 7.

In the appended drawings, the term "gateway" may be sometimes denoted as "GW". In the description that follows, the radio access networks 2a and 2b may be sometimes denoted collectively as "radio access network 2". Also, the base station apparatuses 4a~4d may be sometimes denoted collectively as "base station apparatus 4". Also, mobile station apparatuses 5a~5e may be sometimes denoted collectively as "mobile station apparatus 5". In the description and drawings that follow, the base station apparatus is denoted simply as "base station", and the mobile station apparatus is denoted simply as "mobile station", and the gateway apparatus is denoted simply as "gateway" and the server apparatus is denoted simply as "server".

In some embodiments, the communication system 1 may include a bearer controller 10. The bearer controller 10 controls setting of a bearer that transmits user data in the radio access network 2 and core network 3.

In one embodiment, the communication system 1 may be applied to EPS (Evolved Packet System) defined in 3GPP ($3^{rd}$ Generation Partnership Project). The first gateway 6 corresponds to SGW (Serving Gateway), the second gateway 8 corresponds to PDNGW (Packed Data Network Gateway), and the bearer controller 10 corresponds to MME (Mobility Management Entity).

In other embodiment, the communication system 1 may be applied to UMTS (Universal Mobile Telecommunications System). The first gateway 6 corresponds to SGSN (Serving GPRS Support Node), and the second gateway 8 corresponds to GGSN (Gateway GPRS Support Node). When the communication system 1 is applied to UMTS, the radio access network 2 is provided with a radio network controller (RNC), but not with the bearer controller 10. The apparatus and method disclosed in this specification is not limited to the specific examples of mobile communication system, but can be applied widely to other mobile communication networks.

In the description that follows, it is understood that, in the network protocol for transferring packets in the radio access network 2 and the core network 3, addresses ad20 to ad23 are assigned respectively to the base stations 4a to 4d. Similarly, addresses ad50 and ad80 are assigned to the first gateway 6 and the second gateway 8, respectively. The network protocol may be, for example, Internet Protocol or UDP (User Datagram Protocol).

<2. Bearer>

Figure 2:
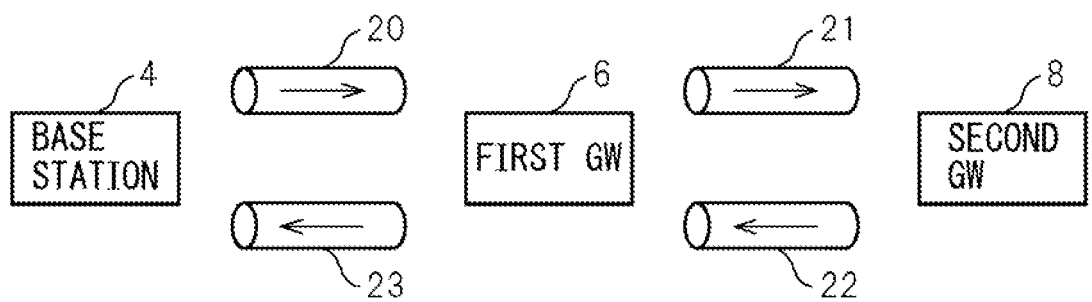
FIG. 2 is a view for illustrating an exemplary setting of a bearer.

Next, bearers provided in the communication system 1 will be described below. FIG. 2 is a view for illustrating the bearer that is set in the communication system 1. Between the base station 4 and the first gateway 6, bearers 20 and 23 are set in uplink and down link, respectively. Between the first gateway 6 and the second gateway 8, bearers 21 and 22 are set in uplink and down link, respectively. The base station 4 is an example of either the first network apparatus or the second network apparatus. The second gateway 8 is another example of either the first network apparatus or the second network apparatus.

When the base station 4 is an example of the first network apparatus, the radio access network 2 is an example of the first network, and the core network 3 is an example of the second network. When the second gateway 8 is an example of the first network apparatus, the core network 3 is an example of the first network, and the radio access network 2 is an example of the second network.

In an embodiment where the communication system 1 is applied to UMTS, in place of the base station 4, bearers 20 and 23 are provided between the radio network controller and the first gateway 6. The radio network controller is an example of either the first network apparatus or the second network apparatus.

When the base station 4 is an example of the first network apparatus, the bearer 20 and 23 are an example of the first bearer and the bearer 21 and 22 are an example of the second bearer. When the second gateway 8 is an example of the first network apparatus, the bearers 21 and 22 are an example of the first bearer, and the bearers 20 and 23 are an example of the second bearer.

The tunneling protocols for setting the bearers 20~23 may be same protocol. An example of tunneling protocol is GTP (GPRS (General Packet Radio Service) Tunneling Protocol). In an embodiment where the communication system is applied to EPS, the bearers 20 and 23 correspond to S1 bearers, and bearers 21 and 22 correspond to S5/S8 bearers. In an embodiment where the communication system is applied to UMTS, the bearers 20 and 23 correspond to Iu bearers, and the bearers 21 and 22 correspond to CN bearers.

To the bearers 20~23, bearer identifier is assigned to identify each bearer. For example, in an embodiment where GTP is used for the tunneling protocol, the bearer identifier corresponds to TEID (Tunnel Endpoint Identifier). The bearers 20~23 are set at the time of attachment of the mobile stations 5, and the base station 4 or the network controller, the first gateway 6 and the second gateway 8 respectively determine and acquire the bearer identifier of the bearer which they terminate and operate.

In an embodiment, the bearer controller 10 selects the first gateway 6 and the second gateway 8 when a mobile station 5 is attached. The bearer controller 10 transmits the bearer identifier for identifying the bearer 20 assigned by the first gateway 6 to the base station 4. The bearer controller 10 transmits the bearer identifier of the bearer 23 assigned by the base station 4 to the first gateway 6. The first gateway 6 and the second gateway 8 respectively assign the identifier of the bearer 22 and the bearer 21 to exchange each other. Such assignment and acquisition of bearer identifiers are executed, for example, in an embodiment in which the communication system 1 is applied to EPS.

In another embodiment, the first gateway 6 selects the second gateway 8 when the mobile station 5 is attached. The first gateway 6 and the second gateway 8 respectively assign the identifier of the bearer 22 and the bearer 21 to exchange each other. The radio network controller and the first gateway 6 respectively assign the identifier of the bearer 23 and the bearer 20 to exchange each other. Such assignment and acquisition of bearer identifiers are executed, for example, in an embodiment in which the communication system 1 is applied to UMTS.

<3. Construction of Packet>

Figure 3A:
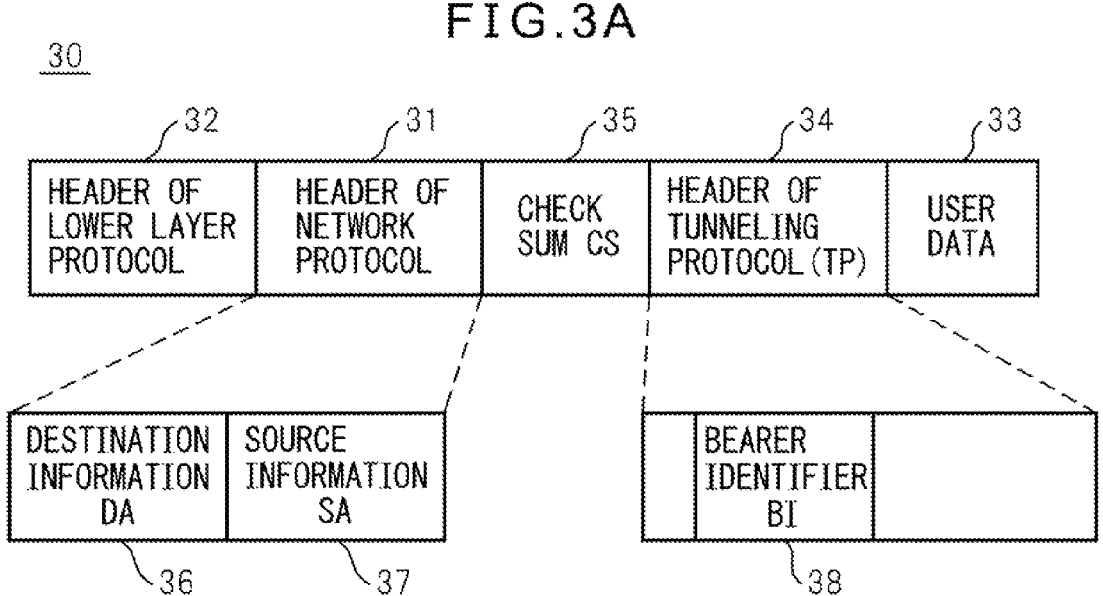
FIG. 3A is a schematic view depicting the data format of a packet including encapsulated user data.

Next, an example of packet in which user data are encapsulated by a tunneling protocol will be described. FIG. 3A is a schematic view depicting the data format of the packet including encapsulated user data.

The packet 30 includes a header 31 of a network protocol, a header 32 of a communication protocol of a lower layer, user data 33, a header 34 of a tunneling protocol, and a check sum 35. The header 31 is a header of the network protocol for transferring the packet in the radio access network 2 and the core network 3. The header 31 includes the destination information 36 and the source information 37. In appended drawings, the destination information and the source information are respectively denoted as "DA" and "SA", respectively.

The header 32 is a header of a communication protocol in lower layer than the network protocol for transferring the packet in the radio access network 2 and the core network 3. The header 34 of the tunneling protocol is a header of the tunneling protocol used in encapsulation of user data to be transmitted on the bearers 20~23. The header 34 includes a bearer identifier 38 of the bearer on which encapsulated user data are transmitted. In appended drawings, the header 34 of the tunneling protocol and the bearer identifier 38 are denoted as "TP" and "BI".

The check sum 35 is an error detecting code added to the packet 30. The check sum 35 may be a check sum included in the header 31, or may be a check sum included in the header other than the header 31. The calculation range of the check sum 35 may include only the portion of the header 31, or may include user data.

Figure 3B:
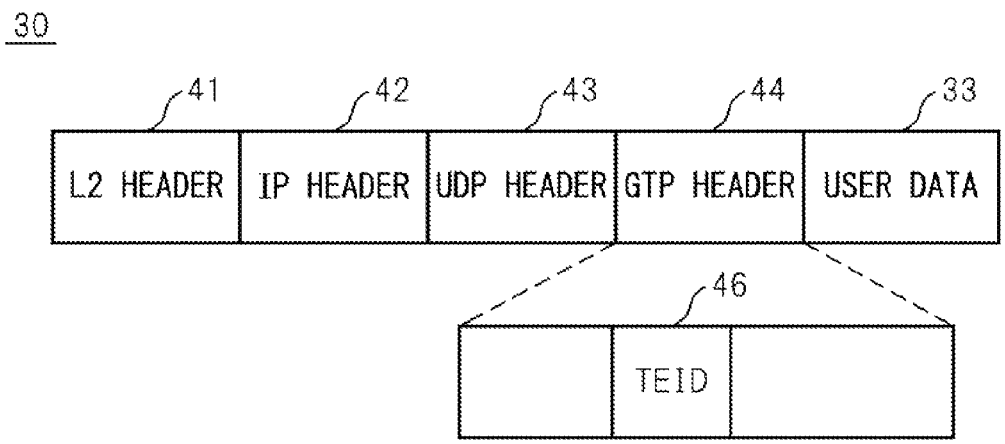
FIG. 3B is a view depicting an exemplary embodiment of the data format of a packet.

FIG. 3B is a view depicting an embodiment of the packet 30 in case where user data are encapsulated by GTP on the bearers 20~23. L2 header 41, IP (Internet Protocol) header 42, and GTP header 44 correspond to the header 32, header 31 and header 34, respectively. TEID 46 corresponds to the bearer identifier 38. The check sum 35 may correspond to both or either one of the check sum of IP header 42 and the check sum of UDP header 43.

Figure 3C:
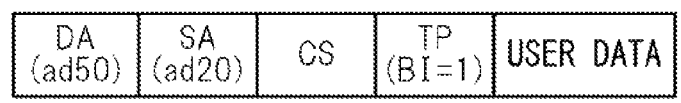
FIG. 3C is a view depicting an exemplary denotation of a packet used in the description of this specification.

FIG. 3C is a view useful for illustrating an example of denotation of the packet used in the following description. In the illustration of a packet, the destination information 36, the source information 37, the check sum 35, the header 34 of tunneling protocol, and user data are expressly denoted, and denotation of the header 32 of a lower layer protocol is omitted. Below DA and SA, which are reference signs of destination information 36 and source information 37, their values are indicated. For example, in the exemplary denotation depicted in FIG. 3C, addresses of the destination and the source are indicated as "ad50" and "ad20", respectively. Below TP, which is reference sign of the header 34, value of the bearer identifier BI is indicated. In the exemplary denotation depicted in FIG. 3C, value of the bearer identifier is indicated as "1".

<4. Description of Various Apparatuses>

<4.1 Hardware Construction>

Figure 4:
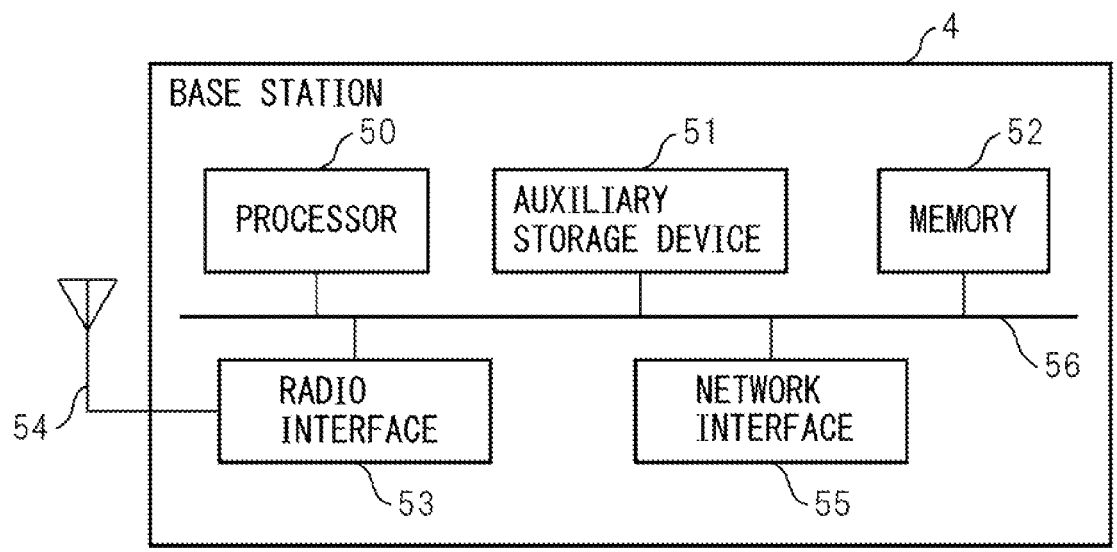
FIG. 4 is a view depicting an example of the hardware construction of a base station apparatus.

Next, the hardware construction of various apparatuses included in the communication system 1 will be described. FIG. 4 is a view depicting an example of the hardware construction of a base station 4. The base station 4 includes a processor 50, an auxiliary storage device 51, a memory 52, a radio interface 53, an antenna 54, a network interface 55, and data bus 56.

The processor 50 executes a control program stored in the auxiliary storage device 51 to thereby execute various processing for controlling the operation of the base station 4 and processing to be described later for transmitting user data. The control program described above is stored in the auxiliary storage device 51. The auxiliary storage device may include a non-volatile memory and a read-only memory. The memory 52 stores the program being executed by the processor 50 and temporary data used by the program. The memory 52 may include a random access memory.

The radio interface 53 carries out transmission and reception of radio signal via the antenna 54, and processing of radio communication to and from the mobile station 5. The network interface 55 carries out processing of communication with the radio access network 2. The constituents 51~53 and 55 described above are electrically connected by a data bus 56. The hardware construction depicted in FIG. 4 is only one example of hardware construction for realizing the base station 4. Any other hardware construction may be adopted as long as the processing described below in this specification can be carried out.

Figure 5:
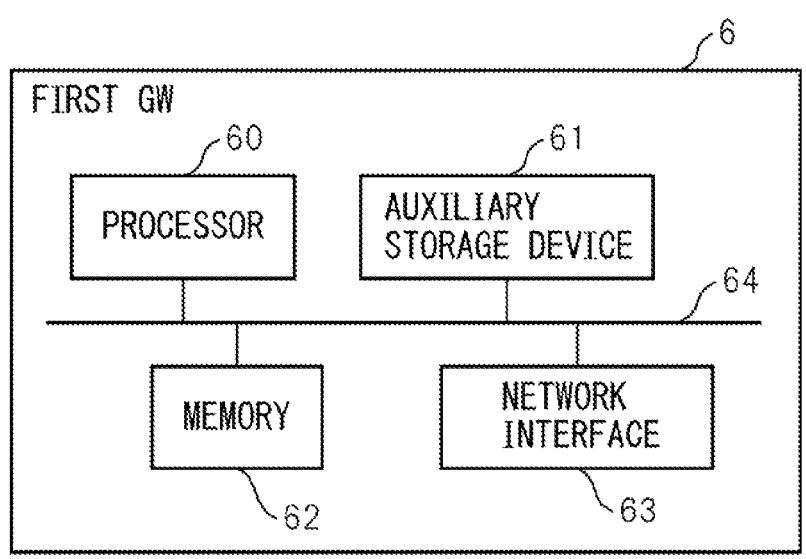
FIG. 5 is a view depicting an example of the hardware construction of a first gateway apparatus.

FIG. 5 is a view depicting an example of the hardware construction of the first gateway 6. The first gateway 6 includes a processor 60, an auxiliary storage device 61, a memory 62, a network interface 63, and a data bus 64.

The processor 60 execute the control program stored in the auxiliary storage device 61 to thereby carry out various processing for controlling the operation of the first gateway 6 and processing to be described later for transmitting user data. The control program described above is stored in the auxiliary storage device 61. The auxiliary storage device 61 may include a non-volatile memory and a read-only memory as storage device. The memory 62 stores the program being executed by the processor 60 and temporary data used in this program. The memory 62 may include a random access memory.

The network interface 63 carries out communication processing with the radio access network 2 and the core network 3. The constituents 60~63 are electrically connected via the data bus 64. The hardware construction depicted in FIG. 5 is only an example of hardware construction for realizing the gateway 6. Any other hardware construction may be adopted as long as the processing described below in this specification can be carried out. The hardware construction of the second gateway 8 and the hardware construction of a radio network controller in an embodiment in which the communication system 1 includes a radio network controller may be same construction as depicted in FIG. 5.

<4.2 Description of the Construction of Various Apparatuses and Processing of Uplink>

Next, functions of various apparatuses and processing of uplink will be described. In the following description using specific example of packets, it is supposed that the mobile station 5a~5c are connected to the base station 4a, and can access to the server 9.

Figure 6A:
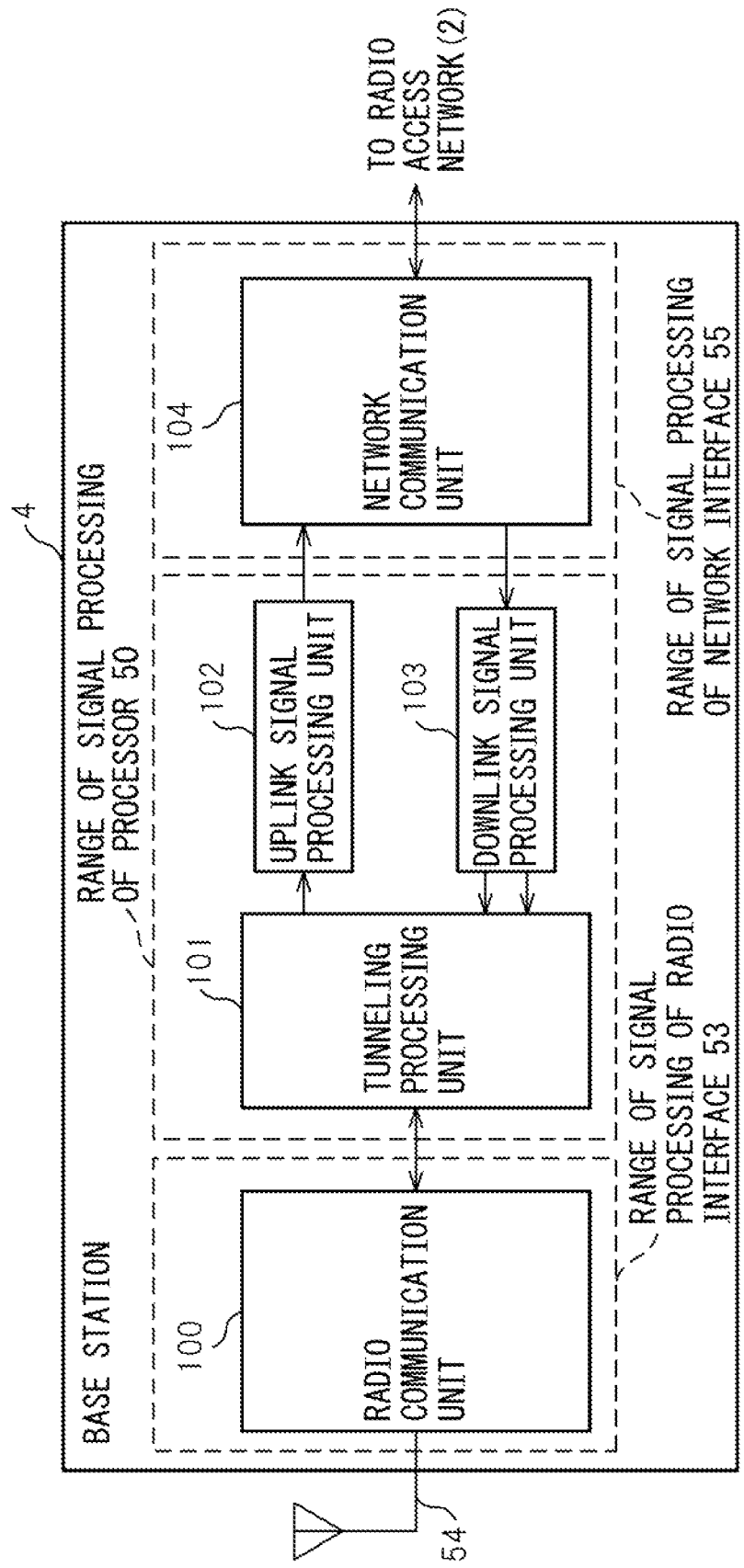
FIG. 6A is a view depicting an exemplary construction of a base station apparatus.

FIG. 6A is a view depicting an exemplary construction of the base station 4. The base station 4 includes a radio communication unit 100, a tunneling processing unit 101, an uplink signal processing unit 102, a downlink signal processing unit 103, and a network communication unit 104. The processor 50 of FIG. 4 carries out information processing by the depicted constituents of the base station 4 in accordance with the program stored in the auxiliary storage device 51 and in cooperation with other hardware constituents of the base station 4 as necessary. FIG. 6A depicts mainly the functions related to following description. In an embodiment, the signal processing by the radio communication unit 100 may be carried out by the radio interface 53 depicted in FIG. 4. The signal processing by the tunneling processing unit 101, the uplink processing unit 102, and the downlink processing unit 103 may be carried out by the processor 50. The signal processing by the network communication unit 104 may be carried out by the network interface 55. In another embodiment, a part of signal processing by the radio communication unit 100 and the network communication unit 104 may be carried out by the processor 50, and a part or all of signal processing by the uplink signal processing unit 102 and by the downlink signal processing unit 103 may be carried out by the network interface 55.

The radio communication unit 100 carries out radio communication processing via the radio interface 53 and the antenna 54 between the base station 4 and the mobile station 5. The radio communication unit 100 receives via the radio link the uplink user data transmitted from the mobile station 5 to the base station 4, and transmits the downlink user data to the mobile station 5.

The tunneling processing unit 101 specifies, at the time of attachment of the mobile station 5 and in accordance with the tunneling protocol forming the bearer 20 and the bearer 23, the identifier of the bearer 20 and the bearer 23 and the destination information indicating the address of the gateway 6 that is the counterpart terminating apparatus. The tunneling processing unit 101 generates a tunneling protocol header 34 for transmitting user data received by the radio communication unit 100 from the mobile station 5 via the bearer 20. The tunneling processing unit 101 encapsulates the user data by adding the header 34 to the user data.

The uplink signal processing unit 102 carries out signal processing for generating packets in order to transmit the encapsulated user data on the radio access network 2. The downlink signal processing unit 103 carries out signal processing for extracting the encapsulated user data from the packets received from the radio access network 2. The tunneling processing unit 101 decapsulates the user data extracted from the packets by the downlink signal processing unit 103. Signal processing of the downlink will be described later. The network communication unit 104 carries out transmission and reception of packets via the network interface 55 to and from the radio access network 2.

Figure 6B:
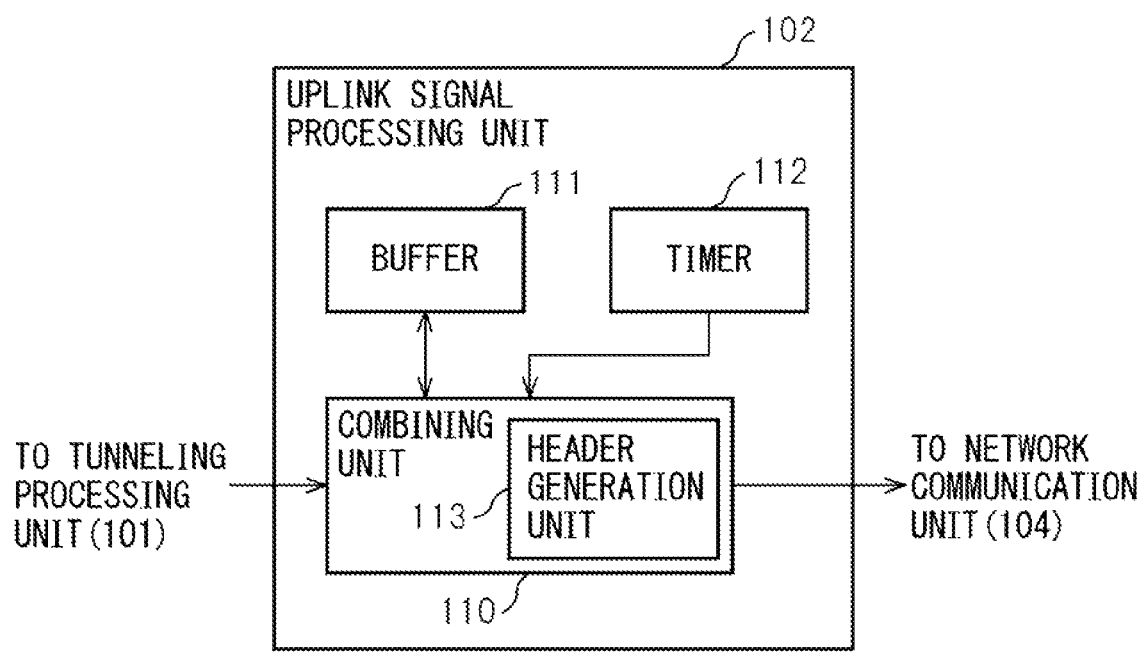
FIG. 6B is a view depicting an exemplary construction of an uplink signal processing unit of the base station apparatus.

FIG. 6B is a view depicting an exemplary construction of the uplink signal processing unit 102. The uplink signal processing unit 102 includes a combining unit 110, a buffer 111 and a timer 112. The combining unit 110 combines a plurality of encapsulated user data to be transmitted to the same first gateway 6. Thus, the combining unit 110 combines a plurality of encapsulated user data with the first gateway 6 as destination. In the description that follows, data in which a plurality of user data is combined are denoted as "combined data".

The combining unit 110 includes a header generation unit 113 that generates a header 31 of the network protocol to be added to the packet storing the combined data. The header generation unit 113 designates an address of the first gateway 6 as the destination of the user data included in the combined data as the destination information 36. Also, the header generation unit 113 designates an address of the base station 4 as source information 37.

The header generation unit 113 stores, by user data, the identifier of the bearer 20 that transmits the user data in the extended area of the header 31. In an embodiment, the extended area may be an option field provided in IPv4 (Internet Protocol version 4). In another embodiment, the extended area may be an extended header provided in IPv6 (Internet Protocol version 6).

The header generation unit 113 stores the number of user data included in the combined data. The header generation unit 113 also stores data length of encapsulated user data in the extended area, by stored user data. The combining unit 110 adds the header 31 to the combined data.

FIG. 7A is a schematic view depicting the data format of the packet generated by the combining unit 110. Encapsulated user data 33a~33c—are a plurality of user data 33-1~33-3 respectively having headers of tunneling protocol 34-1~34-3 added thereto. The packet 30 stores combined data in which a plurality of encapsulated user data 33a~33c is combined. An extended area 39 is added to the packet 30. In the appended drawings, the extended area 39 is denoted as "EA".

FIG. 7B is a view depicting an example of data format of the extended area 39. The extended area 39 may include information element "type", "data length", "number of user data", "data length [1]"~"data length [3]", and "BI [1]"~"BI [3]".

Information element "type" designates a number indicating that the extended area is used for storing following information. Information element "data length" designates the length of data stored in the extended area 39.

Information element "number of user data" designates the number of user data stored in the extended area 39. Information element "data length [1]"~"data length [3]" designates data length of $1^{st}$~$3^{rd}$ encapsulated user data 33a~33c. Information element "BI [1]"~"BI [3]" designates the identifier of the bearer 20 that transmits user data 33-1~33-3.

FIG. 8 is a view depicting an example of the packet 30 generated by the combining unit 110. Combined data including data 10~data 12 are stored in the packet 30. Three data 10~12 are user data transmitted from the mobile stations 5a~5c to the server 9, respectively. Headers TP 10~TP 12 are tunneling protocol headers encapsulating data 10~12, respectively. Values of bearer identifiers of bearer 20 that transmits data 10~12 are "1", "2", and "3", respectively. As the destination information and the source information of the packet 30, address of the first gateway 6 "ad50" and address of the base station 4a "ad20" are designated.

Information element "number of user data" designates "3", which is the number of user data stored in the packet 30. Information element "data length [1]" "data length [3]" designates "128", "150", and "200", which are data length of encapsulated data 10~12. Information element "BI [1]"~"BI [3]" designates "1", "2", and "3", which are bearer identifier of the bearer 20 that transmits the data 10~12.

Referring to FIG. 6B, at the time of combining user data, the combining unit 110 stores the packets storing encapsulated user data into the buffer 111 by destination. The combining unit 110 uses the timer 112 to measure the time that has elapsed since the packet begins to be stored in the buffer 111 by destination. If the elapsed time exceeds a prescribed time period, the combining unit 110 read out the packet from the buffer 111 and outputs it to the network communication unit 104. Also, if the packet length exceeds a prescribed length, the combining unit 110 read out the packet from the buffer 111 and outputs it to the network communication unit 104. The packet outputted to the network communication unit 104 is transmitted to the radio access network 2.

Figure 9:
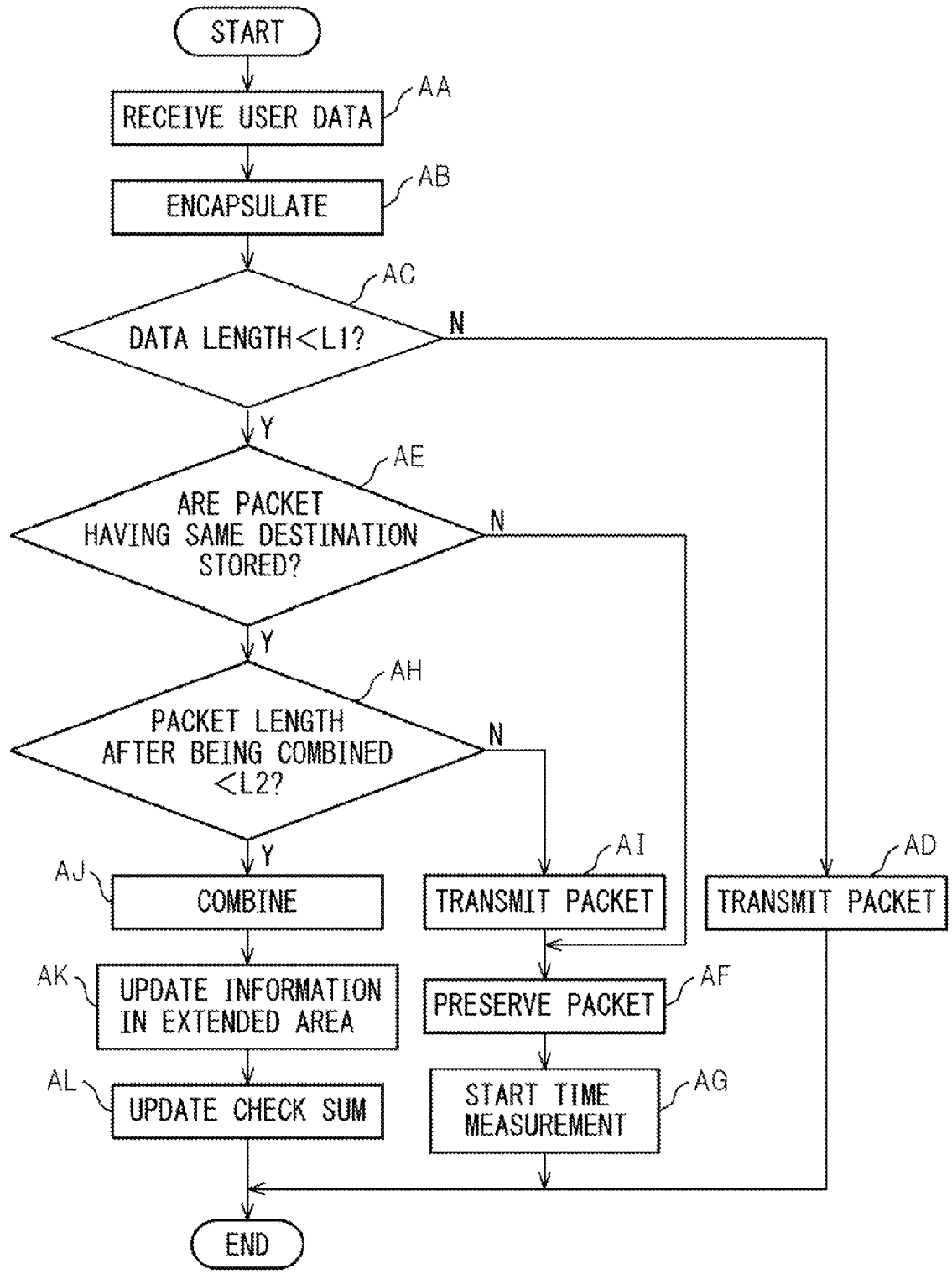
FIG. 9 is a view for illustrating an example of processing by a base station apparatus in an uplink.

Next, flow of processing carried out by the base station 4 in transmitting uplink data will be described with reference to FIG. 9. In another embodiment, each of the operations AA~AL may be a step.

In operation AA, the radio communication unit 100 receives user data transmitted from the mobile station 5. In operation AB, the tunneling processing unit encapsulates the user data by adding a tunneling protocol header to the received user data. The tunneling processing unit 101 outputs the encapsulated user data to the combining unit 110.

In operation AC, the combining unit 110 determines whether or not the encapsulated user data are shorter than a prescribed length L1. If the encapsulated user dat are not shorter than the prescribed length L1 (operation AC: N), the processing proceeds to operation AD. If the user data are shorter than the prescribed length L1 (operation AC: Y), the processing proceeds to operation AE.

In operation AD, the header generation unit 113 generates a packet for storing the encapsulated user data. The network communication unit 104 transmits the packet to the radio access network 2. Thereafter, the processing is terminated.

In operation AE, the combining unit 110 determine whether or not there has already been stored a packet to be transmitted to the same gateway 6 as the destination of the encapsulated user data received from the tunneling processing unit 101 in the buffer 111. If there has been stored a packet (operation AE: Y), the processing proceeds to operation AH. If no packet has been stored (operation AE: N), the processing proceeds to operation AF.

In operation AF, the header generation unit 113 generates a packet for storing the encapsulated user data. The header generation unit 113 sets the value of the information element "number of user data" in the extended area to "1". The header generation unit 113 also stores the data length of the encapsulated user data and the bearer identifier included in the tunneling protocol header into the extended area. Also, the header generation unit 113 calculates the check sum to be added to the packet. The combining unit 110 preserves the packet storing the encapsulated user data in the buffer 111.

In operation AG, the timer 112 starts measurement of time elapsed since the start of storing of the packet. Thereafter, the processing is terminated.

In operation AH, the combining unit 110 determines whether or not, when the received encapsulated user data are combined with the packet which has already been stored in the buffer 111 and has same destination as the received user data, the packet length is shorter than a prescribed length L2. If the packet after being combined is not shorter than the prescribed length (operation AH: N), the processing proceeds to operation AI. If the packet after being combined is shorter than the prescribed length (operation AH: Y), the processing proceeds to operation AJ.

In operation AI, the combining unit 110 reads out the packet which has already been stored in the buffer 111 and outputs it to the network communication unit 104. The network communication unit 104 transmits the packet to the radio access network 2. Thereafter, after executing operations AF and AG for user data received in operation AA, the processing is terminated.

In operation AJ, the combining unit 110 combines the encapsulated user data with the packet which has already been stored in the buffer 111. In operation AK, the combining unit 110 increases the value of the information element "number of user data" in the extended area by one. The header generation unit 113 stores the data length of the encapsulated user data and the bearer identifier included in the tunneling protocol header in the extended area. In operation AL, the header generation unit 113 updates the check sum by adding the value of the data portion added to the packet. Thereafter, the processing is terminated.

Figure 10:
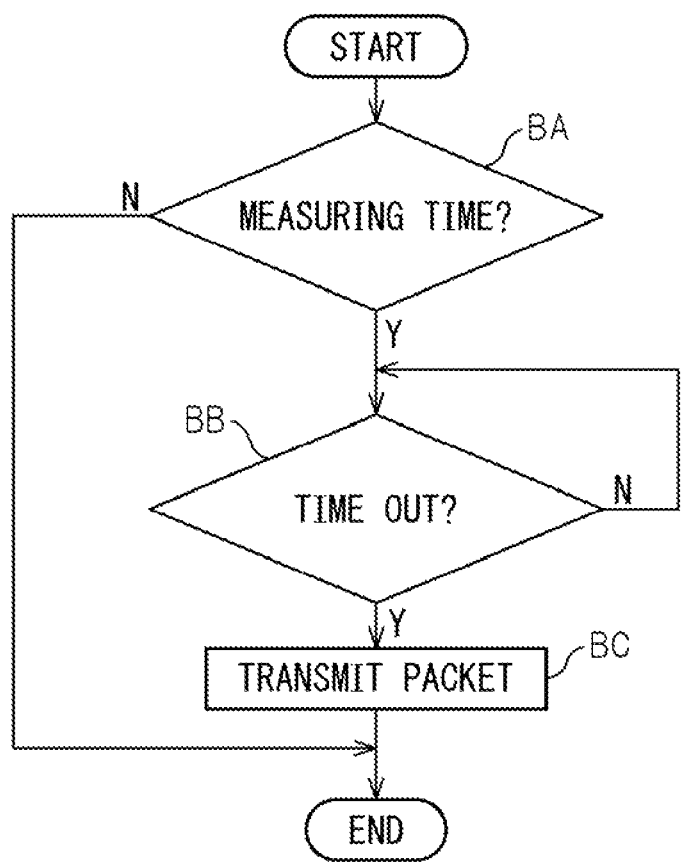
FIG. 10 is a view for illustrating an example of read-out processing of a packet by a timer.

As described above, the packet stored in the buffer 111 is read out and transmitted to the radio access network 2 if the measured time period of the timer 112 exceeds a prescribed time-out period. FIG. 10 is a view useful for illustrating an example of read-out processing by the timer 112. In other embodiments, each of operations BA~BC may be a step. Operations BA~BC are executed by destination.

In operation BA, the combining unit 110 determines whether or not the timer 112 is measuring time, that is, whether or not, for the target destination, a packet has been stored in the buffer 111. If the timer 112 is not measuring time (operation BA: N), the processing is terminated. If the timer 112 is measuring time (operation BA: Y), the processing proceeds to operation BB.

In operation BB, it is determined whether or not the measurement time of the timer 112 exceeds the prescribed time-out period. If the measurement time exceeds the prescribed time-out period (operation BB: Y), the processing proceeds to operation BC. If the measurement time does not exceed the prescribed time-out period (operation BB: N), the processing returns to operation BB. In operation BC, the combining unit 110 reads out the packet stored in the buffer 111 and transmits it to the network communication unit 104. The network communication unit 104 transmits the packet to the radio access network 2. Thereafter, the timer 112 stops time measurement.

Figure 11A:
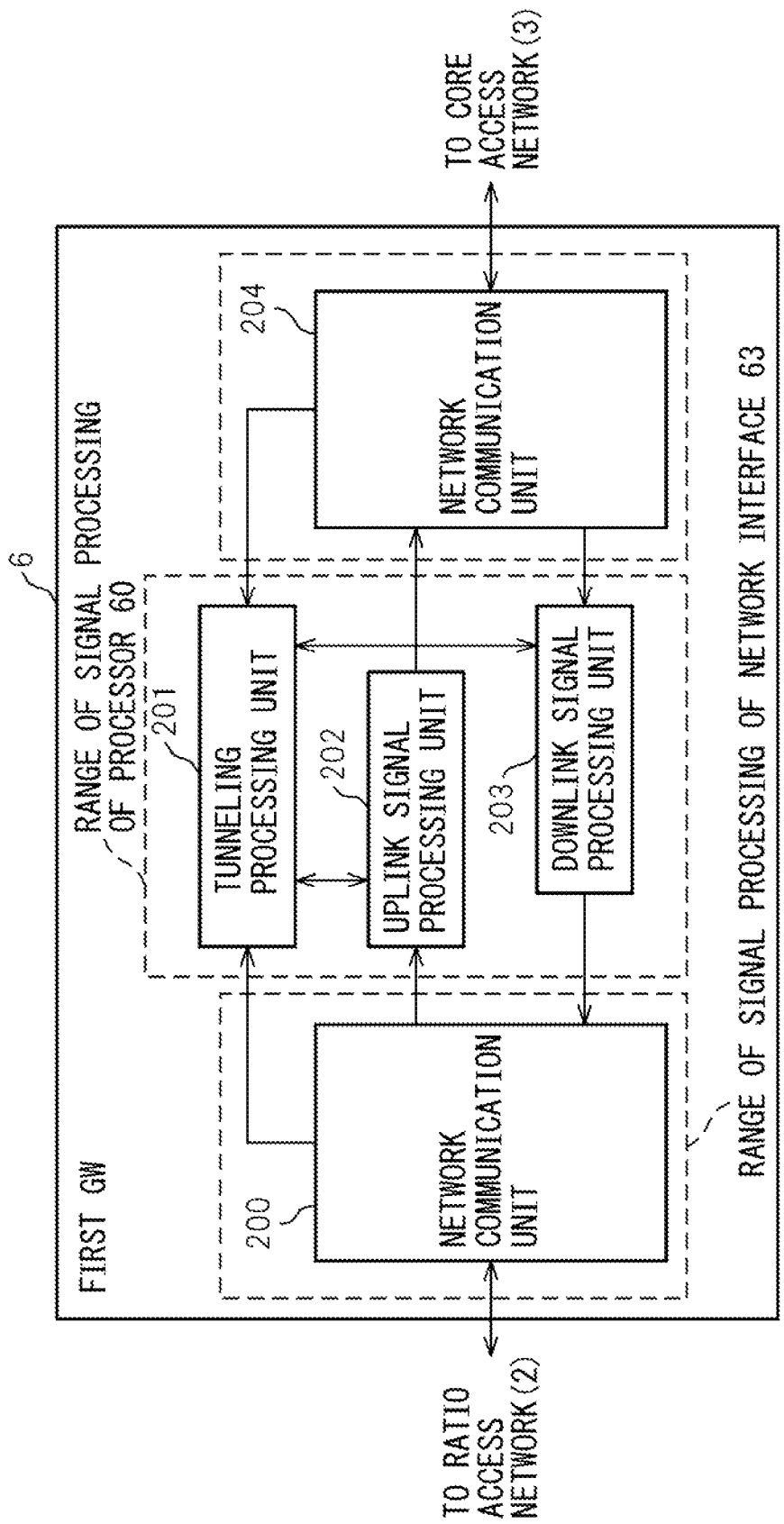
FIG. 11A is a view depicting an exemplary construction of a first gateway apparatus.

Next, the construction and the processing of the first gateway 6 will be described. FIG. 11A is a view depicting an exemplary construction of the first gateway 6. The first gateway 6 includes network communication units 200 and 204, a tunneling processing unit 201, an uplink signal processing unit 202, and a downlink signal processing unit 203. The processor 60 of FIG. 5 carries out information processing by the depicted constituents of the first gateway 6 in accordance with the program stored in the auxiliary storage device 61 and in cooperation with other hardware elements as necessary. FIG. 11A depicts mainly the functions related to following description. In an embodiment, signal processing by the network communication units 200 and 204 may be carried out by the network interface 63 depicted in FIG. 5. Signal processing by the tunneling processing unit 201, the uplink signal processing unit 202 and the downlink signal processing unit 203 may be carried out by the processor 60. In other embodiment, a part of signal processing by the network communication units 200 and 204 may be carried out by the processor 60, and a part or all of signal processing by the uplink signal processing unit 202 and the downlink signal processing unit 203 may be carried out by the network interface 63.

The network communication unit 200 carries out via the network interface 63 the transmission and the reception of packets. The tunneling processing unit 201 specifies, at the time of attachment of the mobile station 5, in accordance with tunneling protocol forming the bearer 20~bearer 23, the identifiers of the bearers 20~23, and the destination information indicating addresses of the base station 4 and the second gateway 8 which are the counterpart terminating apparatuses.

The tunneling processing unit 201 specifies bearer identifier of the bearer 21 that transfers user data based on the source information of the packet received via the bearer 20 and the bearer identifier of the bearer 20 stored in the extended area of the header of the packet. The tunneling processing unit 201 specifies the destination information indicating address of the second gateway 8 to which the packet is to be transferred, based on the source information of the packet received via the bearer 20 and the bearer identifier of the bearer 20 stored in the extended area of the header of the packet.

The uplink signal processing unit 202 executes processing of the packet which was received on the bearer 20 and which stores user data, and carries out regeneration of the user data into a packet to be transferred on the bearer 21. The downlink signal processing unit 203 executes processing of the packet which was received on the bearer 22 and which stores user data, and carries out regeneration of the user data into a packet to be transferred on the bearer 23. Signal processing of downlink will be described later. The network communication processing unit 204 transmits and receives packets to and from the core network 3 via network interface 63.

Figure 11B:
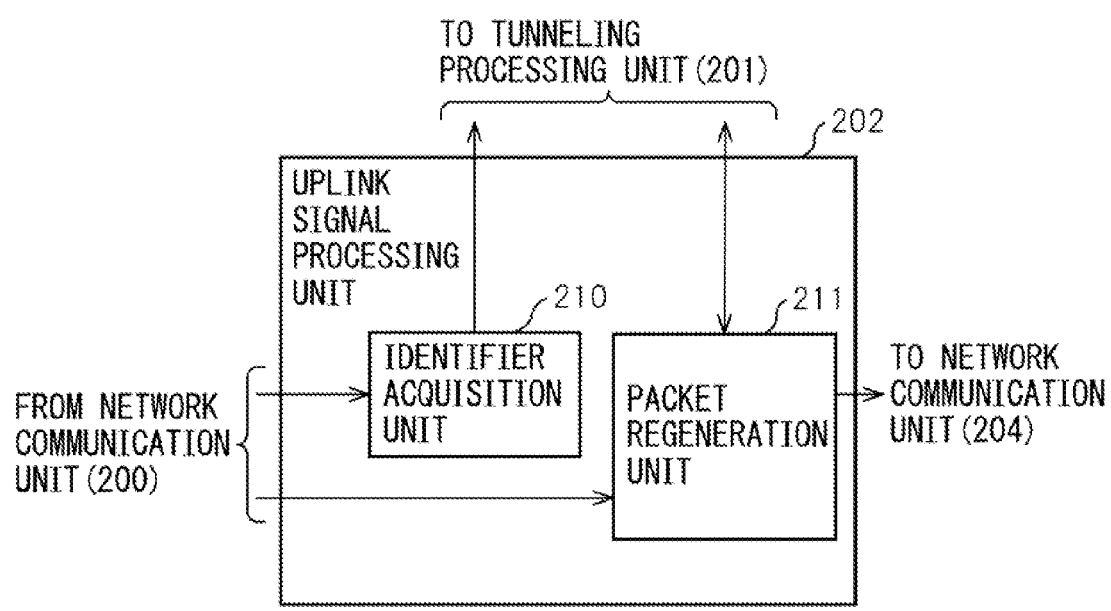
FIG. 11B is a view depicting an exemplary construction of an uplink signal processing unit of the first gateway apparatus.

FIG. 11B is a view depicting an exemplary construction of the uplink signal processing unit 202 of the first gateway 6. The uplink signal processing unit 202 includes an identifier acquisition unit 210 and a packet regeneration unit 211. The identifier acquisition unit 210 acquires the bearer identifier of the bearer 20 from the extended area of the header of the packet received on the bearer 20. The identifier acquisition unit 210 outputs the acquired bearer identifier to the tunneling processing unit 201.

The packet regeneration unit 211 outputs the source information of the packet received on the bearer 20 to the tunneling processing unit 201. The tunneling processing unit 201 outputs, in response to the received bearer identifier and source information, the identifier of the bearer 21 for transferring the packet and the destination information indicating the address of the second gateway 8 to which the packet is to be transferred to the packet regeneration unit 211.

The packet regeneration unit 211 changes, by user data stored in the packet, the bearer identifier of the bearer 20 stored in the extended area to the bearer identifier of the bearer 21 received from the tunneling processing unit 201. The packet regeneration unit 211 changes the destination information of the packet to the destination information indicating the address of the second gateway 8 received from the tunneling processing unit 201. Also, the packet regeneration unit 211 changes the source information of the packet to the source information indicating the address of the first gateway 6.

Also, the packet regeneration unit 211 updates the check sum by adding the difference of values of bearer identifier and the destination information before and after the change to the check sum of the received packet.

Referring to FIG. 12, the result of change in the header of packet changed by the packet regeneration unit 211 will be described below. The packet 30 depicted in FIG. 12 is the packet 30 depicted in FIG. 8 regenerated by the processing of the packet regeneration unit 211. As the destination information and the source information of the packet 30, the address of the second gateway 8 "ad80" and the address of the first gateway 6 "ad50" are respectively designated.

The values of the bearer identifiers stored in the extended area are rewritten from "1", "2", and "3" to the values of the bearer identifier of the bearer 21 on which data 10~12 are transmitted, "10", "11", and "12", respectively.

Figure 13:
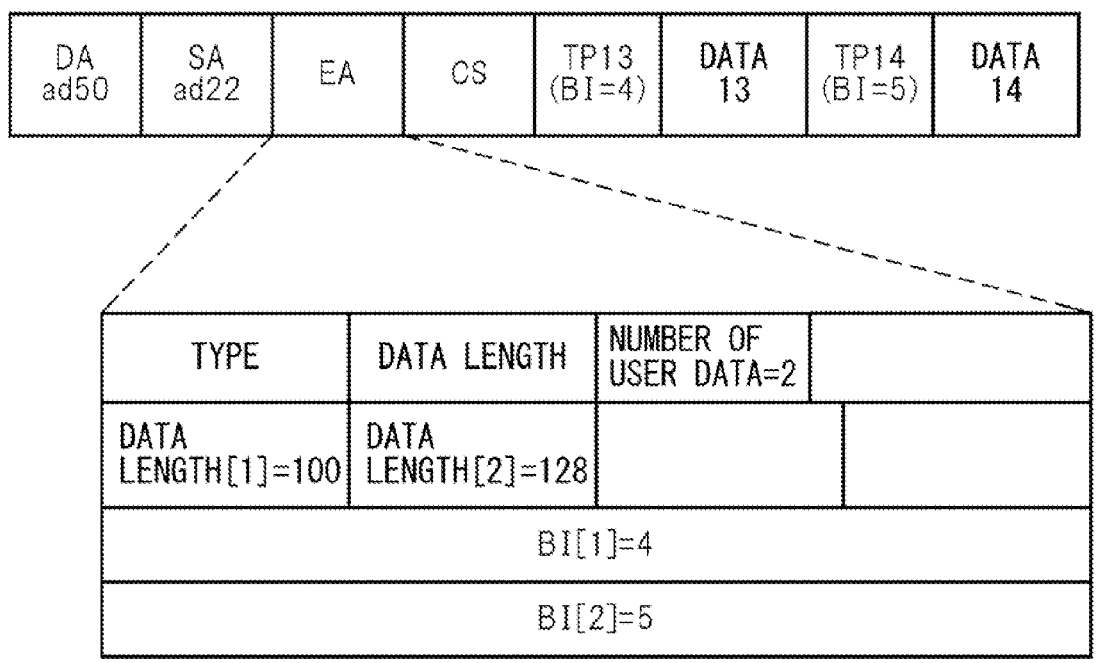
FIG. 13 is a view (Part 1) for illustrating combining of packets by the packet regeneration unit.

When a plurality of packets storing user data to be transmitted to the same second gateway 8 are received, the packet regeneration unit 211 may further combines the combined data stored in each of these packets so as to store them as one combined data in one packet. Referring to FIG. 13 and FIG. 14, packet combining processing of the packet regeneration unit 211 will be described below.

Let us suppose a case in which the mobile stations 5*d* and 5*e* connected to the base station 4*c* also transmit user data to the server 9. The packet 30-1 depicted in FIG. 13 is an example of packet that transmits user data transmitted from the mobile stations 5*d* and 5*e* from the base station 4*c* to the first gateway 6.

Combined data including data 13 and data 14 are stored in the packet 30-1. Two data, i.e., data 13 and data 14, are user data respectively transmitted from the mobile station 5*d* and 5*e* to the server 9. Header TP13 and TP14 are tunneling protocol headers respectively encapsulating data 13 and data 14. Values of the bearer identifier of the bearer which transmits data 13 and data 14 are "4" and "5", respectively. As the destination information and source information of the packet 30-1, the address of the first gateway "ad50" and the address of the base station "ad20" are designated, respectively.

When user data stored in the packet 30-1 and user data 30 stored in the packet 30 depicted in FIG. 8 are to be transmitted to the same second gateway 8, the packet regeneration unit 211 recombines the encapsulated user data stored in these packets, i.e., if same second gateway 8 is designated as the destination of the user data stored in the packet 30-1 and the packet 30, the packet regeneration unit 211 recombines the combined user data stored in these packets.

The packet 30 depicted in FIG. 14 is the packet regenerated by the packet regeneration unit 211 by processing the packets depicted in FIG. 8 and FIG. 13. The packet stores the combined data of data 10~14 which are user data transmitted from the mobile stations 5*a*~5*e* to the server 9 combined with tunneling protocol headers TP10~TP14 encapsulating data 10~14. As the destination information and the source information of the packet, address of the second gateway 8 "ad80" and address of the first gateway 6 "ad50" are designated.

Value of the information element "number of user data" stored in the extended area is changed to "5" indicating the number of user data after being combined. In the extended area, the bearer identifiers of the bearers that transmit data 10~14 from the first gateway 6 to the second gateway 8, "10"~"14", are stored.

Figure 15:
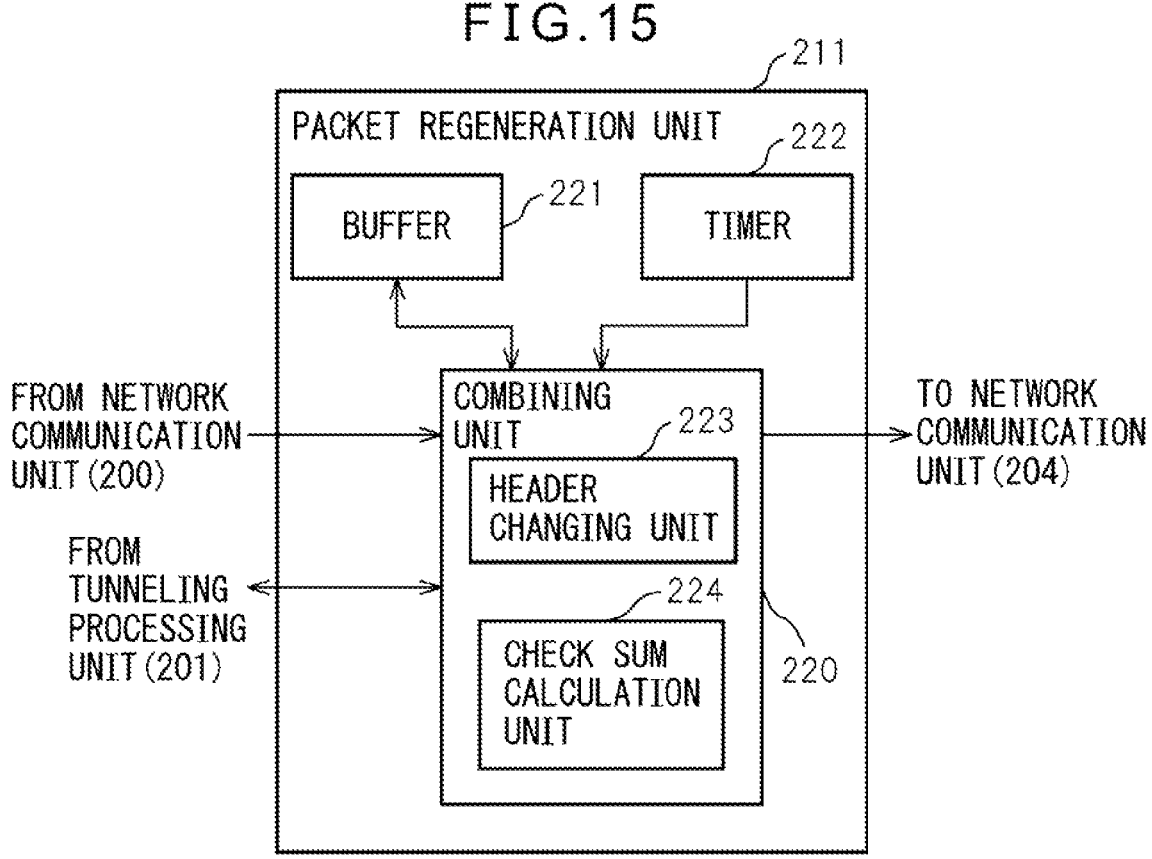
FIG. 15 is a view depicting an exemplary construction of the packet regeneration unit of the uplink signal processing unit.

The construction of the packet regeneration unit 211 that carries out changing of headers and combining of data as described above will be described below. FIG. 15 is a view depicting an exemplary construction of the packet regeneration unit of the uplink signal processing unit 202. The packet regeneration unit includes a combining unit 220, a buffer 221 and a timer 222.

The combining unit 220 further combines a plurality of combined data respectively stored in a plurality of received packets and transmitted to same second gateway 8 to form one combined data and store it as one packet. The combining unit 220 includes a header changing unit 223 and a check sum calculation unit 224.

The header changing unit 223 changes the destination information of the packet to the destination information indicating address of the second gateway 8 received from the tunneling processing unit 201. Also, it changes the source information of the packet to the source information indicating address of the first gateway 6. The header changing unit 203 also changes the bearer identifier of the bearer 20 stored in the extended area to the bearer identifier of the bearer 21 received from the tunneling processing unit 201.

When a plurality of combined data are combined, the header changing unit 223 changes the information element "number of user data" in the extended area to the number of user data after being combined. Also, the header changing unit 223 combines the information element "data length [1]"—included in each of the received packets. The header changing unit 223 also combines the information element "BI [1]"—included in each of the received packets.

The check sum calculation unit 224 carries out calculation required to update the check sum to be added to the packet. At this time, the check sum calculation unit 224 updates the check sum by adding the difference of values of the bearer identifier and destination information before and after the change to the check sum of the received packet. By thus calculating the check sum based on the difference of change produced in the header portion of the packet, the check sum calculation unit 224 can omit calculation of check sum on the combined data portion.

When combining the combined data of a plurality of packets, the combining unit 220 stores the packets storing combined data in the buffer 221 by destination. The combining unit 220 uses the timer 222 to measure the time elapsed since the start of storing the packet in the buffer 221, by destination. If the elapsed time exceeds a prescribed time-out period, the combining unit 220 reads out the packet from the buffer 221 and outputs it to the network communication unit 204.

Also, if the packet length exceeds a prescribed length, the combining unit 220 reads out the packet from the buffer 221 and outputs it to the network communication unit 204. The packet outputted to the network communication unit 204 is transmitted to the core network 3.

Figure 16:
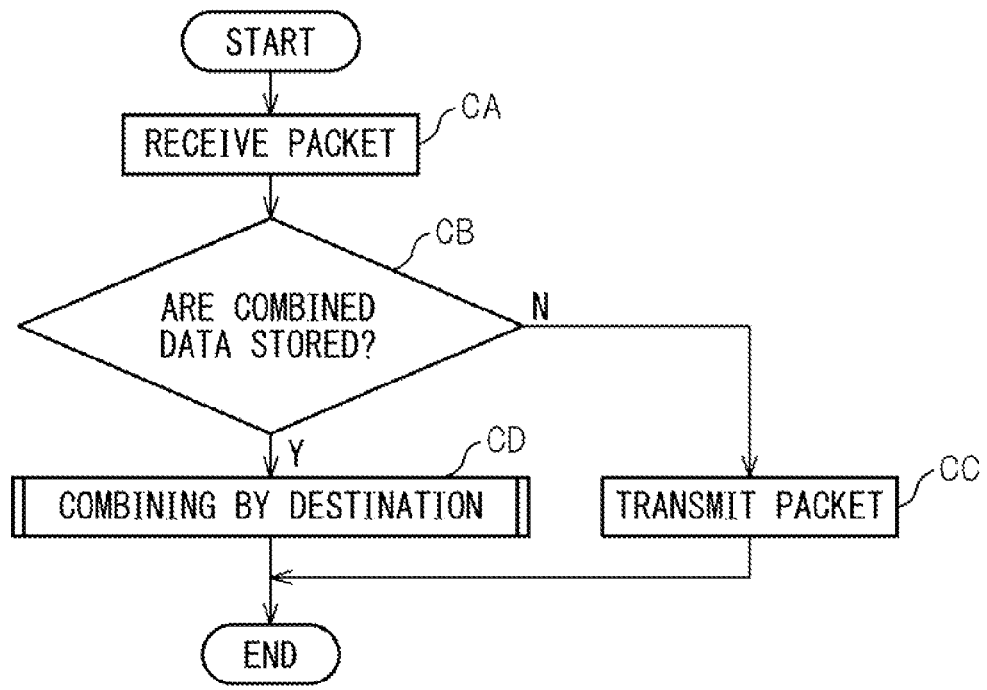
FIG. 16 is a view for illustrating an example of processing of the first gateway apparatus in an uplink.

Next, the flow of processing executed by the first gateway 6 when transmitting an uplink data will be described with reference to FIG. 16. In other embodiments, each of operations CA~CD may be a step.

In operation CA, the network communication unit 200 receives a packet transmitted in the radio access network 2. In operation CB, the combining unit 220 determines whether or not combined data are stored in the received packet. If combined data are stored in the received packet (operation CB: Y), the processing proceeds to operation CD. If combined data are not stored in the received packet (operation CB: N), the processing proceeds to operation CC.

In operation CC, the combining unit 220 reads out the packet to be transmitted to the same destination of the second gateway 8 from the buffer 221, and outputs them to the network communication unit 204. The combining unit 220 outputs the received packet to the network communication unit 204. These packets are transmitted to the core network 3 by the network communication unit 204. The timer 222 stops measurement of time, and thereafter the processing is terminated.

In operation CD, the combining unit 220 carries out combining processing by destination, wherein combined data stored in the received packets are combined, by the second gateway 8 as the same destination.

Figure 17:
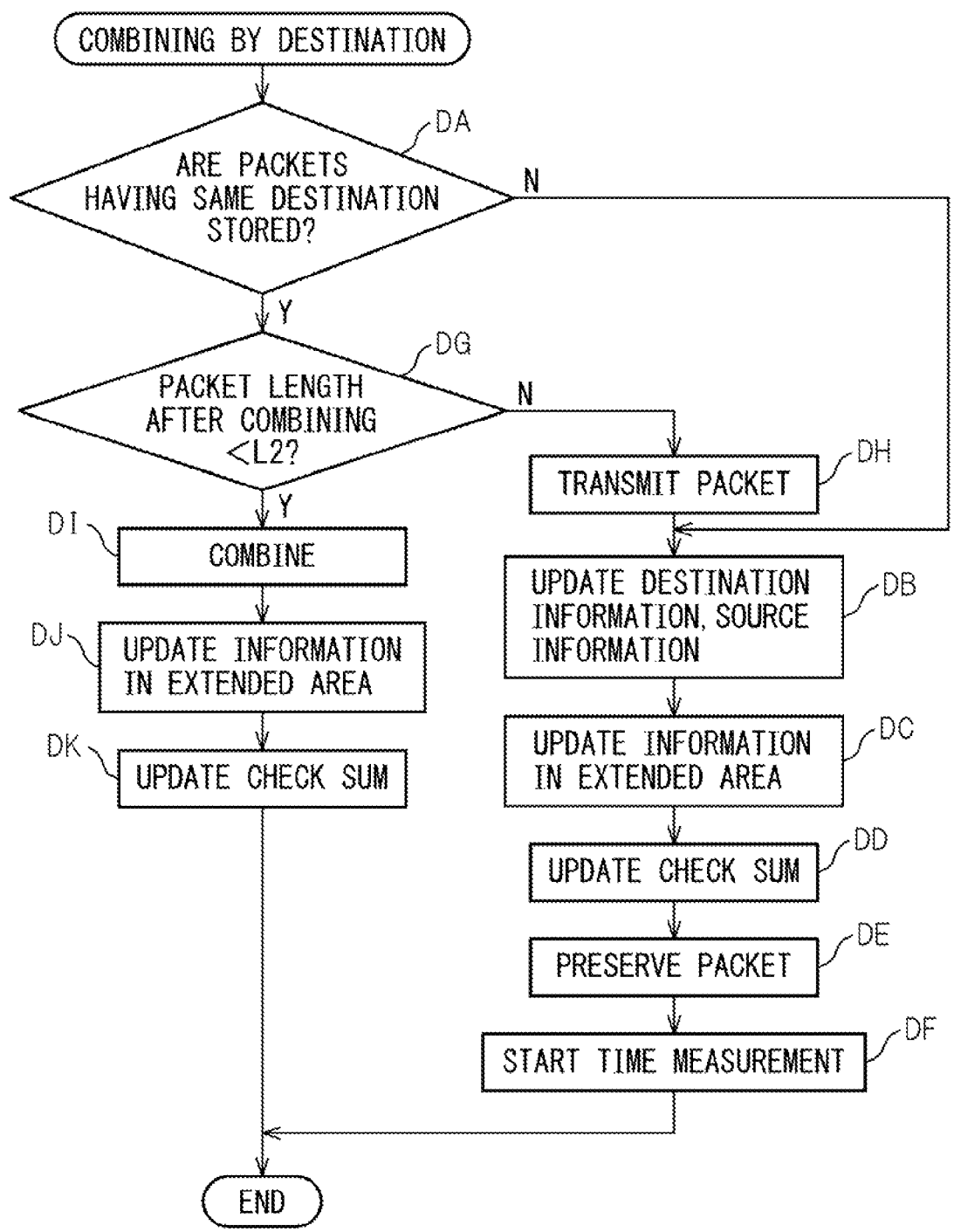
FIG. 17 is a view for illustrating an example of combining processing by destination.

FIG. 17 is a view for illustrating an example of operation CD of combining processing by destination. In other embodiments, each of operations DA~DK may be a step. In operation DA, the identifier acquisition unit 210 acquires the bearer identifier of the bearer 20 that transmits the received packet, and outputs it to the tunneling processing unit 201. The packet regeneration unit 211 outputs the source information of the received packet to the tunneling processing unit 201. The tunneling processing unit 201, in response to these bearer identifier and source information, specifies the identifier of the bearer 21 for transferring the packet and the second gateway 8 as destination of transfer.

The combining unit 220 determines whether or not there has already been stored in the buffer 221 a packet to be transmitted to same second gateway 8 as the user data stored in the received packet. If a packet has been stored (operation DA: Y), the processing proceeds to operation DG. If a packet has not been stored (operation DA: N), the processing proceeds to operation DB.

In operation DB, the header changing unit 223 changes the destination information and the source information of the received packet. In operation DC, the header changing unit 223 updates the information in the extended area. In operation DD, the check sum calculation unit 224 updates the check sum to be added to the packet. At this time, the check sum calculation unit 224 updates the check sum by adding the difference of values of the bearer identifier and the destination information before and after the change, to the check sum of the received packet. In operation DE, the combining unit 220 preserves the packet in the buffer 221. In operation DF, the timer 222 starts measurement of time elapsed since the start of storing the packet. Thereafter, processing is terminated.

In operation DG, the combining unit 220 determines whether or not, when combined data of received packet are combined with the packet having same destination as the user data stored in the received packet already stored in the buffer 221, the packet length is shorter than a prescribed length L2. If the packet after being combined is not shorter than the prescribed length (operation DG: N), the processing proceeds to operation DH. If the packet after being combined is shorter than the prescribed length (operation DG: Y), the processing proceeds to operation DI.

In operation DH, the combining unit 220 reads out the packet already stored in the buffer 221, and outputs it to the network communication unit 204. The network communication unit 204 transmits the packet to the core network 3. Thereafter, after operation DB~DF are executed for the packet received in operation CA, the processing is terminated.

In operation DI, the combining unit 220 further combines the combined data stored in the received packet with the packet already stored in the buffer 221. In operation DJ, the header changing unit 223 updates the information in the extended area. That is, the header changing unit 223 sets the value of the information element "number of user data" in the extended area to the number of user data included in the combined data after being combined. Also, the header changing unit 223 stores the data length of the encapsulated user data included in the combined data after being combined, and the bearer identifier included in the tunneling protocol header in the extended area.

In operation DK, the check sum calculation unit 224 updates the value of the check sum stored in the buffer 221. Thereafter, the processing is terminated.

As has been described above, if the measurement time of the timer 222 exceeds the prescribed time-out period, the packet stored in the buffer 221 is read out and is transmitted to the radio access network 2. Read-out processing by the timer 222 may be the same as the read-out processing described above with reference to FIG. 10.

Next, the construction and processing of the second gateway 8 will be described. FIG. 18A is a view depicting an exemplary construction of the second gateway 8. The second gateway 8 includes a network communication unit 300 and 303, an uplink signal processing unit 301, a tunneling processing unit 302, and a downlink signal processing unit 304. As in the hardware construction of the first gateway 6 depicted in FIG. 5, the processor 60 carries out information processing by the depicted constituents of the second gateway 8 in accordance with the program stored in the auxiliary storage device and in cooperation with other hardware constituents of the second gateway 8 as required. FIG. 18A depicts mainly the functions related to the following description. In an embodiment, information processing by the network communication unit 300 and 303 may be carried out by the network interface 63. Information processing by the tunneling processing unit 302, the uplink signal processing unit 301 and the downlink signal processing unit 304 may be carried out by the processor 60. In other embodiments, a part of information processing by the network communication unit 300 and 303 may be carried out by the processor 60. Also, a part or all of information processing by the uplink signal processing unit 301 and the downlink signal processing unit 304 may be carried out by the network interface 63.

The network communication unit 300 transmits and receives packets to and from the core network 3 via the network interface 63. The uplink signal processing unit 301 carries out signal processing for extracting encapsulated user data from the packet received from the core network 3. The uplink signal processing unit 301 acquires the bearer identifier of the bearer 21 stored in the extended area of the header of the packet.

At the time of attachment of the mobile station 5, in accordance with the tunneling protocol that forms the bearer 21 and the bearer 22, the tunneling processing unit 302 specifies the identifier of the bearer 21 and the bearer 22, and the destination information indicating address of the first gateway 6 that is the counterpart terminating apparatus. The tunneling processing unit 302, in response to the bearer identifier of the bearer 21 acquired from the extended area of the header of the packet, decapsulates the user data extracted from the packet. The network communication unit 303 transmits and receives packets to and from public network 7 via the network interface 63.

The tunneling processing unit 302 encapsulates user data that was received by the network communication unit 303 from the public network 7. The downlink signal processing unit 304 carries out signal processing of encapsulated user data and generates a packet to be transmitted on the core network 3. Signal processing by the downlink signal processing unit will be described later.

Figure 18B:
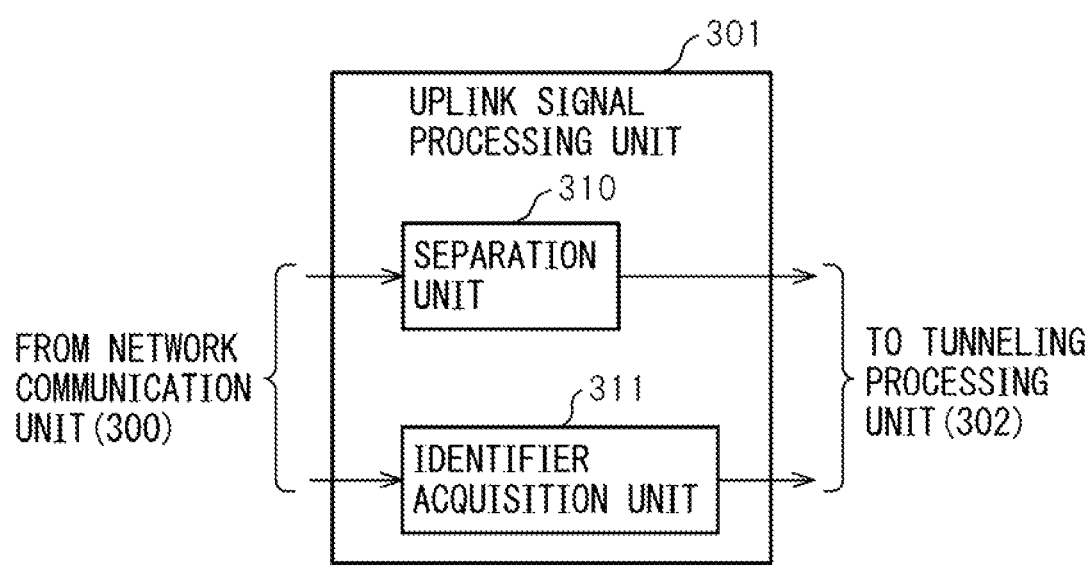
FIG. 18B is a view depicting the construction of a first example of the uplink signal processing unit of the second gateway apparatus.

FIG. 18B is a view depicting an exemplary construction of the uplink signal processing unit 301 of the second gateway 8. The uplink signal processing unit 301 includes a separation unit 310 and an identifier acquisition unit 310. The separation unit 310 separates the encapsulated user data from the combined data stored in the packet received by the network communication unit 300 on the bearer 21.

FIG. 19A is a view depicting an example of a packet received by the network communication unit 300. As the destination information and the source information of the packet, address of the second gateway 8 "ad80" and address of the first gateway 6 "ad50" are designated, respectively. Values of the bearer identifiers stored in the tunneling protocol header TP11~TP12 of encapsulated user data 33a~33c remain to be values of bearer identifier of the bearer 20 "1"~"3". In the extended area, values of the bearer identifier of the bearer 21, "10", "11", and "12", are stored.

The separation unit 310 separates each encapsulated user data 33a~33c from the combined data based on values of the information elements "number of user data", "data length [1]", "data length [2]",—in the extended area. FIG. 19B is a view depicting each of encapsulated user data 33a~33c separated from the packet as depicted in FIG. 19A.

The identifier acquisition unit 311 acquires the bearer identifiers of the bearer 21 that respectively transmit encapsulated user data 33a~33c from the extended area of the header stored in the received packet. In the example depicted in FIG. 19A, the identifier acquisition unit 311 acquires the bearer identifiers, "10"~"12", of the bearer 21 that transmit user data 33a~33c, respectively.

The tunneling processing unit 302, in response to the bearer identifier of the bearer 21 acquired by the identifier acquisition unit 311, decapsulates user data extracted from the packet by the separation unit 310.

Figure 20A:
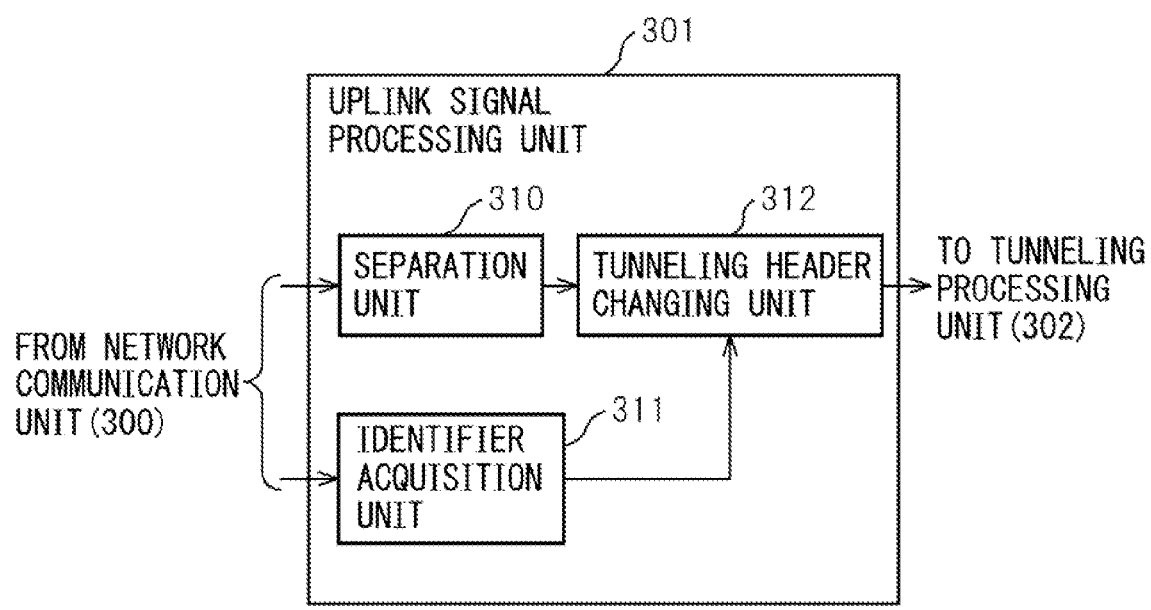
FIG. 20A is a view depicting a second example of the construction of the uplink signal processing unit of the second gateway apparatus.

In one embodiment, values of the bearer identifier of the tunneling protocol header of user data separated from the packet may be changed to the values of bearer identifier acquired by the identifier acquisition unit 311 before being inputted to the tunneling processing unit 302. FIG. 20A is a view depicting a second example of the uplink signal processing unit 301 of the second gateway 8.

The uplink signal processing unit 301 includes a tunneling header changing unit 312. The tunneling header changing unit 312 changes value of the bearer identifier of tunneling protocol separated from the packet by the separation unit 310 to the bearer identifier of the bearer 21 acquired by the identifier acquisition unit 311.

Figure 20B:
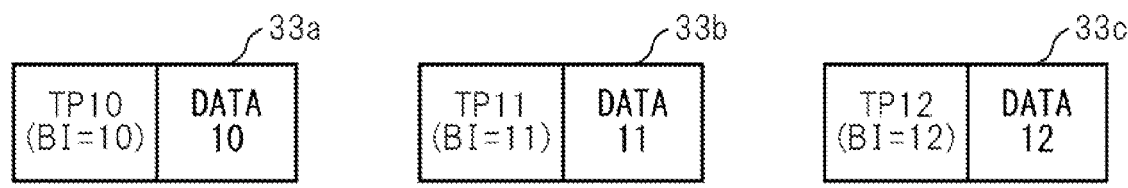
FIG. 20B is a view for illustrating a second example of separation processing of a packet by the separation unit.

FIG. 20B is a view depicting user data 33a~33c with the changed value of the bearer identifier. Values of the bearer identifier stored in the tunneling protocol header TP11~TP12 are changed to values of the bearer identifier of the bearer 21, "10", "11", and "12". The tunneling header changing unit 312 outputs user data having the changed values of the bearer identifier to the tunneling processing unit 302.

Figure 21:
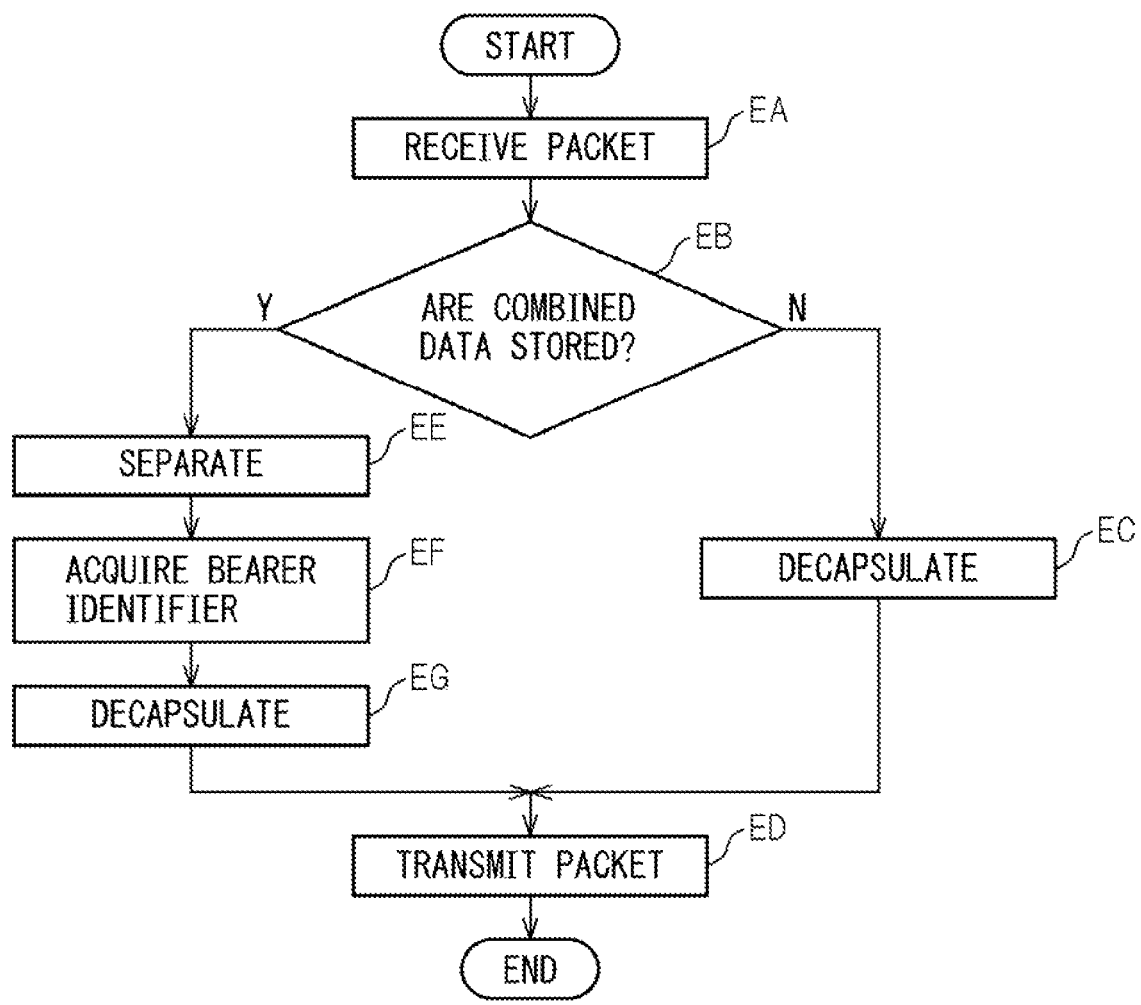
FIG. 21 is a view for illustrating an example of processing of the second gateway apparatus in an uplink.

Next, flow of processing carried out by the second gateway 8 when transmitting uplink data will be described with reference to FIG. 21. In other embodiments, each of operations EA~EG may be a step.

In operation EA, the network communication unit 300 receives the packet transmitted in the core network 3. In operation EB, the separation unit 310 determines whether or not combined data are stored in the received packet. If combined data are stored in the received packet (operation EB: Y), the processing proceeds to operation EE. If combined data are not stored in the received packet (operation EB: N), the processing proceeds to operation EC.

In operation EC, the tunneling processing unit 302 decapsulates the received packet. In operation ED, the network communication unit 303 generates, from the decapsulated user data, a packet to be transmitted on the public network 7, and transmit the packet to the public network 7.

In operation EE, the separation unit 310 separates each encapsulated user data from the combined data stored in the received packet. In operation EF, the identifier acquisition unit 311 acquires, from the extended area of the received packet, the bearer identifiers of the bearer 21 that respectively transmits user data. In operation EG, the tunneling processing unit 302, in response to the bearer identifier acquired by the identifier acquisition unit 311, decapsulates user data separated by the separation unit 310. Thereafter, user data decapsulated in operation ED is transmitted to the public network 7.

<4.3 Description of Processing by Each Apparatus in Downlink>

Next, processing in downlink will be described below. In the description that follows, it is supposed that the mobile stations 5a~5c are connected to the base station 4a and the mobile stations 5d and 5e are connected to the base station 4c. In the description that follows, it is understood that data are transmitted from the server 9 to the mobile stations 5a, 5b and 5e.

The network communication unit 303 depicted in FIG. 18A receives a packet transmitted from the public network 7 to the mobile station 5. The tunneling processing unit 302 encapsulates user data stored in the packet received by the network communication unit 303 from the public network 7. The downlink signal processing unit 304 carries out signal processing and generates a packet for transmission of encapsulated user data on the core network 3. The network communication unit 300 transmits the packet generated by the downlink signal processing unit 304 to the core network 3.

Figure 22A:
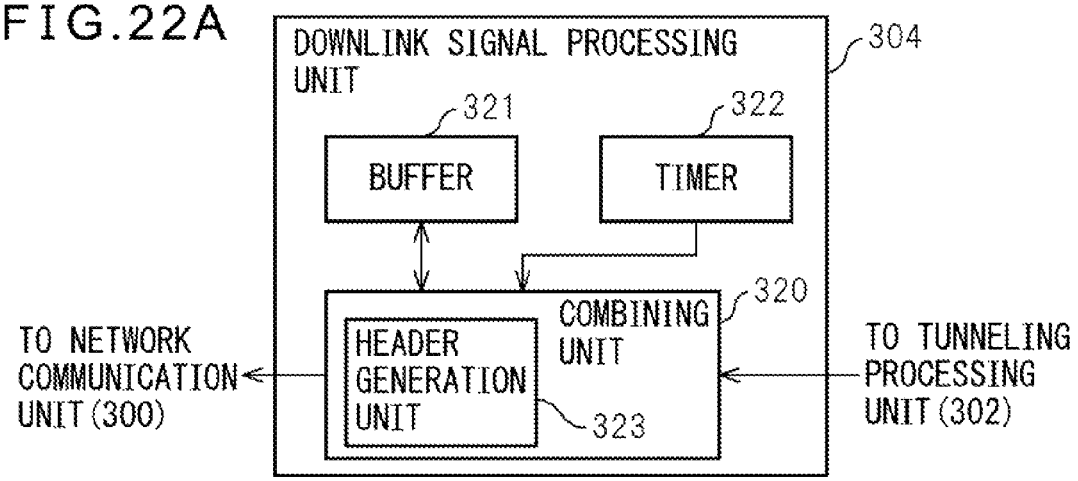
FIG. 22A is a view depicting exemplary construction of downlink signal processing unit of the second gateway apparatus, the first gateway apparatus and the base station apparatus.

FIG. 22A is a view depicting an exemplary construction of the downlink signal processing unit 304 of the second gateway 8. The downlink signal processing unit 304 includes a combining unit 320, a buffer 321 and a timer 322. The combining unit 320 includes a header generation unit 323. Thus, the downlink signal processing unit 304 has the same construction as the uplink signal processing unit 102 of the base station 4.

The downlink signal processing unit 304 carries out similar processing as the processing carried out by the uplink signal processing unit 102 to thereby combine a plurality of encapsulated user data to be transmitted to the same first gateway 6. The header generation unit 323 designates destination address of the first gateway 6 for user data included in the combined data and address of the second gateway 8 as the destination information and the source information of the packet.

The header generation unit 323 stores the identifier of the bearer 22 that transmits user data into the extended area of the header of the packet, by user data included in the combined data. Also, the header generation unit 323 stores a number of user data included in the combined data, and data length of user data in an extended area.

FIG. 23 is a view depicting an example of packet generated in downlink by the second gateway 8. Combined data including data 110, 111, and 114 are stored in the packet 30-2. Three data 110, 111, and 114 are user data transmitted by the server 9 to the mobile stations 5a, 5b and 5e, respectively. Headers TP110, TP111 and TP114 are tunneling protocol headers respectively encapsulating data 110, 111, and 114. Values of the bearer identifier of the bearer 22 on which data 110, 111, and 114 are transmitted are "21", "22", and "25", respectively. As the destination information and the source information of the packet 30-2, address of the first gateway 6 "ad50" and address of the second gateway 8 "ad80" are designated.

As information element "number of user data" in the extended area, the number of user data stored in the packet 30-2, "3", is designated. As information element "data length [1]"~"data length [3]", the data length of the encapsulated data 110, 111, and 114, "130", "128", and "184", are designated. As information element "BI [1]"~"BI [3]", values of bearer identifier of the bearer 22 on which data 110, 111 and 114 are transmitted, "21", "22", and "25", are designated.

Next, processing of downlink in the first gateway 6 will be described. The network communication unit 204 depicted in FIG. 11 receives a packet transmitted from the second gateway 8 via the bearer 22 of the core network 3 to the first gateway 6. The tunneling processing unit 201 specifies, based on the source information of the packet received via the bearer 22 and bearer identifier of the bearer 22 stored in the extended area of the header of the packet, the bearer identifier of the bearer 23 that transfers user data. The tunneling processing unit 201 specifies, based on the source information of the packet received via the bearer 22 and the bearer identifier of the bearer 22 stored in the extended area of the header of the packet, the destination information indicating address of the base station 4 to which the packet is transferred.

The downlink signal processing unit 203 carries out processing of the packet storing user data received on the bearer 22, and regeneration of the user data as a packet to be transferred on the bearer 23. The network communication unit 200 transmits the packet generated by the downlink signal processing unit 203 to the radio access network 2.

Figure 22B:
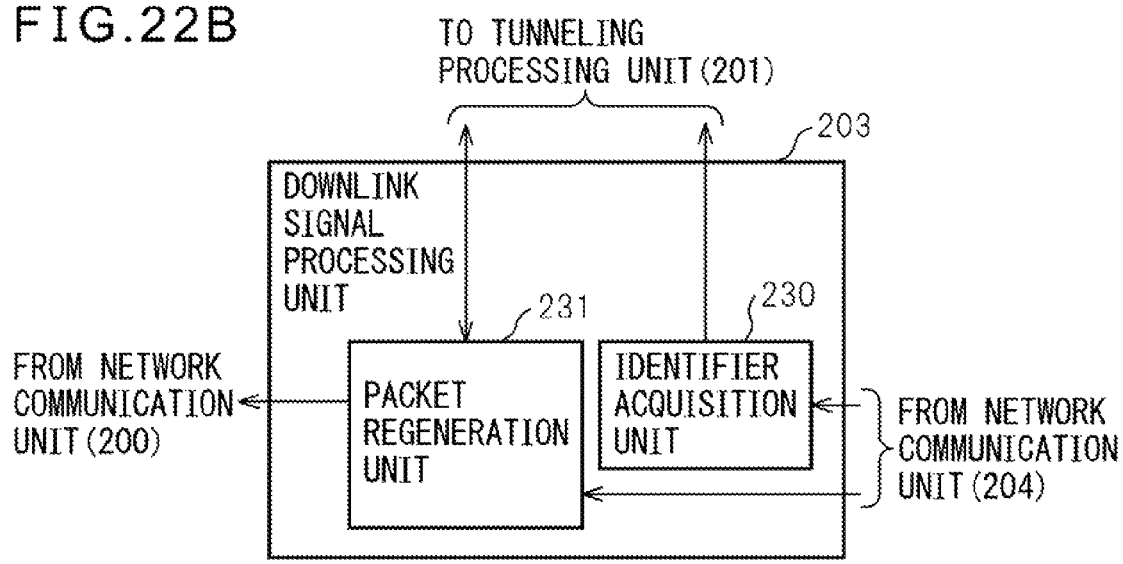
FIG. 22B is a view depicting exemplary construction of downlink signal processing unit of the second gateway apparatus, the first gateway apparatus and the base station apparatus.

FIG. 22B is a view depicting an exemplary construction of the downlink signal processing unit 203 of the first gateway 6. The downlink signal processing unit 203 includes an identifier acquisition unit 230 and a packet regeneration unit 231. The identifier acquisition unit 230 acquires the bearer identifier of the bearer 22 from the extended area of the header of the packet received on the bearer 22. The identifier acquisition unit 230 outputs the acquired bearer identifier to the tunneling processing unit 201.

The packet regeneration unit 231 outputs the source information of the packet received on the bearer 22 to the tunneling processing unit 201. The tunneling processing unit 201, in response to the bearer identifier and the source information received, outputs the identifier of the bearer 23 that transfers the packet and the destination information indicating address of the base station apparatus 4 to which the packet is transferred, to the packet regeneration unit 231.

The packet regeneration unit 231, by user data stored in the packet, changes the bearer identifier of the bearer 22 stored in the extended area to the bearer identifier of the bearer 23. The packet regeneration unit 231 changes the destination information and the source information of the packet to addresses of the base station 4 and the first gateway 6. Also, the packet regeneration unit 231 updates the check sum by adding difference of values of the bearer identifier and the destination information before and after the change to the check sum of the received packet.

When the destination of user data included in combined data stored in the packet includes a plurality of base stations 4, the packet regeneration unit 231 divides the combined data by destined base station 4. Also, when a plurality of packets storing user data to be transmitted to same base station 4 are received, combined data stored in these packets are combined with each other.

Figure 24:
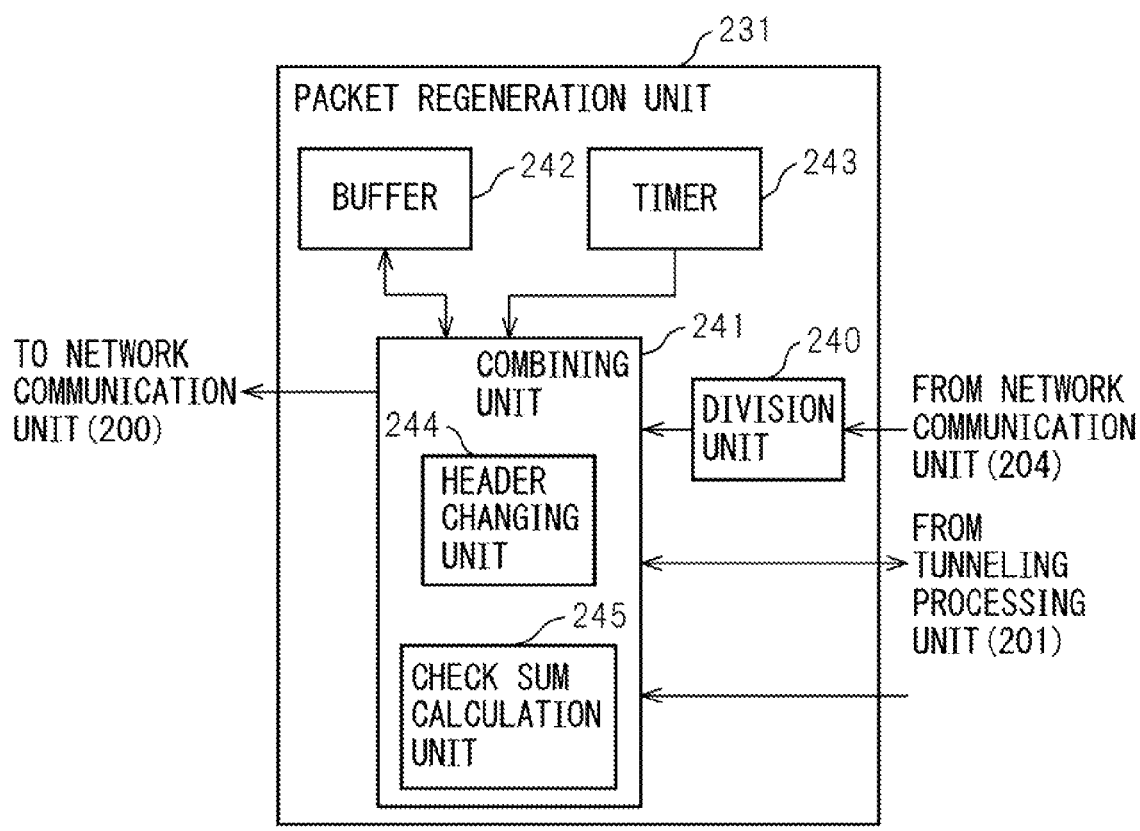
FIG. 24 is a view depicting an exemplary construction of the packet regeneration unit of the downlink signal processing unit.

FIG. 24 is a view depicting an exemplary construction of the packet regeneration unit 231 of the downlink signal processing unit 203. The packet regeneration unit 231 includes a division unit 240, a combining unit 241, a buffer 242, and a timer 243. The combining unit 241 includes a header changing unit 223 and a check sum calculation unit 224.

Figure 25A:
FIG. 25A is a view for illustrating the packet division processing by the packet regeneration unit.
Figure 25B:
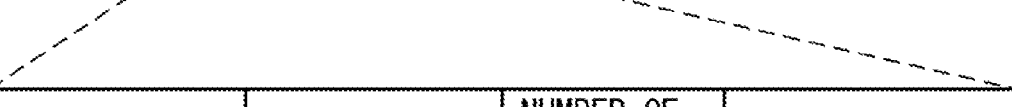
FIG. 25B is a view for illustrating the packet division processing by the packet regeneration unit.

The division unit 240 divides combined data stored in the received packet by destined base station 4. Packets 30-3 and 30-4 depicted in FIG. 25A and FIG. 25B respectively store data generated by dividing the combined data stored in the packet 30-2 of FIG. 23. In the packet 30-3, combined data including the encapsulated data 110 and 111 to be transmitted to the base station 4a are stored. In the packet 30-4, the encapsulated data 114 to be transmitted to the base station 4c are stored.

As information element "number of user data" in the extended area of the packet 30-3, the number of user data stored in the packet 30-3, "2", is designated. As information element "data length [1]" and "data length [2]", data length of the encapsulated data 110 and 111, "130" and "128", are designated. As information element "BI [1]" and "BI [2]", the bearer identifier of the bearer 22 on which data 110 and 111 are transmitted, "21" and "22", are designated.

As information element "number of user data" in the extended area of the packet 30-4, the number of user data stored in the packet 30-3, "1", is designated. As information element "data length [1]", data length of the encapsulated data 114, "184", is designated. As information element "BI [1]", the bearer identifier of the bearer 22 on which data 114 are transmitted, "25", is designated.

In one embodiment, similar division unit may be provided in the uplink signal processing unit 202. The division unit divides the combined data by destined second gateway 8 if destinations of user data included in the combined data includes a plurality of second gateways 8. By thus providing the division unit in uplink, if combined data including user data of different destinations are received in uplink by the first gateway 6, the combined data can be divided.

Referring to FIG. 24, the combining unit 241, the buffer 242 and the timer 243 execute same processing as the combining unit 220, the buffer 221 and the timer 222 of the uplink signal processing unit so as to combine a plurality of combined data to be transmitted to the same base station 4 in downlink.

The header changing unit 244 designates address of the base station 4 which is the destination of user data included in the combined data and address of the first gateway 6 as the destination information and the source information of the packet, respectively. The header changing unit 244 stores the identifier of the bearer 23 transmitting user data by user data included in the combined data in the extended area of the header of the packet.

Next, processing of downlink in the base station 4 will be described. The network communication unit 104 depicted in FIG. 6 receives a packet transmitted from the first gateway 6 via the bearer 23 of the radio access network 2 to the base station 4. The downlink processing unit 103 carries out signal processing of extracting encapsulated user data from the packet received from the radio access network 2. Also, the downlink processing unit 103 acquires the bearer identifier of the bearer 23 stored in the extended area of the header of the packet.

Figure 22C:
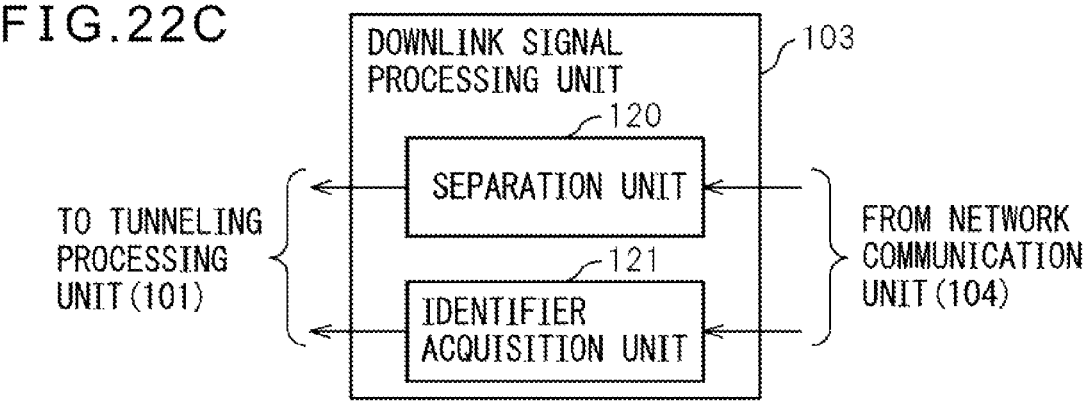
FIG. 22C is a view depicting exemplary construction of downlink signal processing unit of the second gateway apparatus, the first gateway apparatus and the base station apparatus.

FIG. 22C is a view depicting an exemplary construction of the downlink signal processing unit 103 of the base station 4. The downlink signal processing unit 103 includes a division unit 120 and an identifier acquisition unit 121. Thus, the downlink signal processing unit 103 has same construction as the uplink signal processing unit 301 of the second gateway 8. The downlink signal processing unit 103 acquires user data and the bearer identifier of the bearer 23 by the same processing as the uplink signal processing unit 301.

The tunneling processing unit 101 decapsulates user data extracted from the packet in response to the bearer identifier of the bearer 23 acquired from the extended area of the header of the packet. The network communication unit 300 transmits the decapsulated user data to the mobile station 5.

The present embodiment may be applied to a system in which the bearers 20 and 23 are set, in place of the base station 4, between the radio network 2 and the first gateway 6. FIG. 26 is a view depicting an exemplary construction of a radio network controller. The radio network controller has the same construction as the base station 4 depicted in FIG. 6A.

The radio network controller includes a communication unit 105 that receives uplink user data transmitted from the base station 4 to the radio network controller, and transmits downlink user data to the base station 4. The tunneling processing unit 101 encapsulates uplink user data received by the communication unit 105. The communication unit 105 transmits user data decapsulated by the tunneling processing unit 101 to the base station 4.

In accordance with the present embodiment, even if a plurality of user data encapsulated by tunneling protocol are combined and stored in a packet, the combined user data can be respectively decapsulated. Therefore, in a mobile packet communication network having bearers set by tunneling protocol, user data can be combined and stored in a packet to thereby reduce the number of short packets.

If number of short packets increases, the overhead of control information becomes large. In accordance with the present embodiment, only one network protocol header needs to be added to a plurality of user data so that the overhead of control information for user data can be reduced.

In the present embodiment, the bearer identifier is stored in the extended area of network protocol header that is lower layer than tunneling protocol. When user data are transferred between bearers, the first gateway 6 rewrites the bearer identifier stored in the network protocol header. The second gateway 8 or the base station 4 that receives user data from the first gateway apparatus executes decapsulation referring to the bearer identifier stored in the network protocol header.

Therefore, the first gateway 6 can omit rewriting of the bearer identifier stored in the tunneling protocol header when transferring user data. Thus, processing by the first gateway 6 is reduced. Since the first gateway 6 can omit rewriting of the bearer identifier in the tunneling protocol header, it needs not refer to the combined data. Therefore, by combining encapsulated user data, increase of rewriting load of the bearer identifier in the tunneling protocol header imposed on the first gateway 6 can be reduced.

When the bearer identifier in the tunneling protocol header is not rewritten, change of the tunneling protocol header at the time of transfer of packet can be avoided. That is, change of the combined data at the time of transfer of packet can be avoided. Therefore, the first gateway 6 can update the check sum only by adding the difference of header portion before and after the change to the original check sum of the received packet. Thus, check sum calculation for data portion can be omitted and a load of the first gateway 6 can be reduced further.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system comprising:
   a gateway apparatus that connects a first network and a second network in which user data are transmitted by a network protocol;
   a first network apparatus in said first network in which a first bearer is set for each mobile station apparatus for transmitting said user data by a tunneling protocol in higher layer than said network protocol to and from said gateway apparatus; and
   a second network apparatus in said second network in which a second bearer is set for each mobile station apparatus for transmitting said user data by said tunneling protocol to and from said gateway apparatus;
   wherein said first network apparatus comprises:
   a first tunneling processing unit that encapsulates the user data in accordance with said tunneling protocol;
   a data combining unit that generates combined data by combining a plurality of said encapsulated user data to be transmitted to the same said gateway apparatus;
   a header generation unit that generates a header of said network protocol which stores bearer identifier of said first bearer for transmitting user data included in said combined data and which designates said gateway apparatus as a destination; and a first transmission unit that transmits a packet of said combined data having said header added thereto;

wherein said gateway apparatus comprises:

a reception unit that receives, via said first network, the packet of the combined data in which the plurality of said encapsulated user data encapsulated in accordance with said tunneling protocol are combined and to which the header of said network protocol storing the bearer identifier of said first bearer transmitting user data included in the combined data is added;

an identifier acquisition unit that acquires the bearer identifier of said first bearer from said header;

a tunneling processing unit that, based on source information of the packet and the bearer identifier of said first bearer, identifies said second network apparatus and specifies an identifier of said second bearer which transmits said user data;

a packet regeneration unit that regenerates a packet of the combined data in which the plurality of said encapsulated user data are combined and to which said network protocol header storing the bearer identifier of said second bearer that transmits the user data included in the combined data and designating said second network apparatus as a destination is added; and a second transmission unit that transmits the packet regenerated by said packet regeneration unit to said second network.

2. A network apparatus in a first network, wherein a gateway apparatus connects said first network and a second network in which packets including user data are transmitted by a network protocol, and a bearer is set for each mobile station apparatus for transmitting said packets including user data by a tunneling protocol in higher layer than said network protocol to and from said gateway apparatus, said network apparatus comprising:

an extension area, included in each said packet, which extends from the header of the packet;

a tunneling processing unit that encapsulates the user data in accordance with said tunneling protocol;

a data combining unit that generates combined data of different user data in which a plurality of encapsulated different user data to be transmitted to the same said gateway apparatus are combined;

a header generation unit that generates a header of said network protocol which stores a bearer identifier of a first bearer in said extension area, the first bearer transmitting the user data included in said combined data and the header designating said gateway apparatus as a destination, and further, the header of said network protocol storing, in a first extension area as said extension area, the bearer identifier of the first bearer, for each user data transmitting user data included in the combined data and designating said gateway apparatus as a destination, is changed, in a second extension area as said extension area instead of the first extension area, at the gateway apparatus, to a header of said network protocol storing a bearer identifier of a second bearer, for each user data transmitting user data included in the combined data and designating said second network as a destination; and a transmission unit that transmits the packet of the combined data having said header to be changed in the extension area and added thereto to said gateway apparatus.

3. The network apparatus as claimed in claim 2, said network apparatus further comprising:

a reception unit that receives, via said first network, the packet of combined data in which a plurality of encapsulated user data encapsulated in accordance with said tunneling protocol are combined and to which a header of said network protocol storing the bearer identifier of said bearer transmitting user data included in the combined data is added;

a separation unit that separates said encapsulated user data from said combined data received; and an identifier acquisition unit that acquires said bearer identifier from said header received;

wherein said tunneling processing unit, in response to the bearer identifier acquired from said header, decapsulates said encapsulated user data separated from said combined data.

4. The network apparatus as claimed in claim 2, wherein said data combining unit comprises a timer that limits the time period for combining a plurality of user data.

5. The network apparatus as claimed in claim 2, wherein said data combining unit limits data length of one user data.

6. A gateway apparatus that connects a first network and a second network in which packets including user data are transmitted by a network protocol, with a first bearer being set for each mobile station apparatus for transmitting said packets including user data by a tunneling protocol in higher layer than said network protocol to and from a first network apparatus in said first network, and a second bearer being set for each mobile station apparatus for transmitting said packets including user data by said tunneling protocol to and from a second network apparatus in said second network; said gateway apparatus comprising:

an extension area, included in each said packet, which extends from the header of the packet;

a reception unit that receives, via said first network, a packet of combined data of different user data in which a plurality of encapsulated different user data encapsulated in accordance with said tunneling protocol are combined and to which a header of said network protocol storing the bearer identifier of said first bearer transmitting the user data included in the combined data is added;

an identifier acquisition unit that acquires the bearer identifier of said first bearer from said header;

a tunneling processing unit that, based on source information of said packet and the bearer identifier of said first bearer, identifies said second network apparatus and specifies an identifier of said second bearer transmitting said user data;

a packet regeneration unit that regenerates a packet of combined data by changing, in said extension area, the header of said network protocol storing, in a first extension area as said extension area, the bearer identifier of said first bearer, for each user data, transmitting user data included in the combined data and designating said gateway apparatus as a destination, to a header of said network protocol storing, in a second extension area as said extension area instead of the first extension area, a bearer identifier of said second bearer, for each user data, transmitting user data included in the combined data and designating said second network apparatus as a destination; and a transmission unit that transmits the packet regenerated by said packet regeneration unit to said second network.

7. The gateway apparatus as claimed in claim 6, further comprising a check sum calculation unit that calculates the check sum to be added to the packet to be transmitted to said second network apparatus by adding the difference of said bearer identifier before and after the change to the check sum that has been added to the packet received from said first network.

8. A non-transitory computer readable recording medium having a computer program for operating a computer as a network apparatus in a first network, a gateway apparatus connecting said first network and a second network in which packets including user data are transmitted by a network protocol, a bearer being set for each mobile station apparatus for transmitting said packets including user data by a tunneling protocol in higher layer than said network protocol to and from said gateway apparatus, said computer program causing said computer to execute processing of:

including, in each said packet, an extension area which extends from the header of the packet;

encapsulating the user data in accordance with said tunneling protocol;

generating combined data of different user data in which a plurality of said encapsulated different user data to be transmitted to the same gateway apparatus are combined;

generating a header of said network protocol storing a bearer identifier of a first bearer in said extension area, the first bearer transmitting the user data included in said combined data and the header designating said gateway apparatus as a destination, and further, the header of said network protocol storing, in a first extension area as said extension area, the bearer identifier of the first bearer, for each user data, transmitting user data included in the combined data and designating said gateway apparatus as a destination, is changed, in a second extension area as said extension area instead of the first extension area at the gateway apparatus, to a header of said network protocol storing a bearer identifier of a second bearer, for each user data, transmitting user data included in the combined data and designating said second network as a destination; and transmitting the packet of the combined data having said header to be changed in the extension area and added thereto to said gateway apparatus.

9. A non-transitory computer readable recording medium having a computer program for operating a computer as a gateway apparatus, connecting a first network and a second network in which packets including user data are transmitted by a network protocol, with a first bearer being set for each mobile station apparatus for transmitting said packets including user data by a tunneling protocol in a higher layer than said network protocol to and from a first network apparatus in the first network, and a second bearer being set for each mobile station apparatus for transmitting said user data by said tunneling protocol to and from a second network apparatus in the second network, said computer program causing said computer to execute processing of:

including, in each said packet, an extension area which extends from the header of the packet;

receiving, via said first network, a packet of combined data of different user data in which a plurality of encapsulated different user data encapsulated in accordance with said tunneling protocol are combined and to which a header of said network protocol storing the bearer identifier of said first bearer transmitting user data included in the combined data is added;

acquiring the bearer identifier of said first bearer from said header;

identifying said second network apparatus based on source information of said packet and the bearer identifier of said first bearer;

specifying an identifier of said second bearer transmitting said user data based on the source information of said packet and the bearer identifier of said first bearer;

regenerating a packet of the combined data in which the plurality of said encapsulated user data are combined and to which a header of said network protocol storing the bearer identifier of said second bearer transmitting user data included in the combined data, and the packet is regenerated by changing, in said extension area, the header of said network protocol storing the bearer identifier of said first bearer, for each user data, transmitting user data included in the combined data and designating said gateway apparatus as a destination, to a header of said network protocol storing, in a second extension area as said extension area instead of the first extension area, a bearer identifier of said second bearer, for each user data, transmitting user data included in the combined data and designating said second network apparatus as a destination; and transmitting said regenerated packet to said second network apparatus.

10. A data transmission method for transmitting user data between a gateway apparatus connecting a first network and a second network in which packets including user data are transmitted in a network protocol, and a network apparatus in said first network via a bearer set for each mobile station apparatus by a tunneling protocol in higher layer than said network protocol, said transmission method comprising:

including, in each said packet, an extension area which extends from the header of the packet;

encapsulating the user data in accordance with said tunneling protocol;

generating combined data of different user data in which a plurality of said encapsulated different user data to be transmitted to same said gateway apparatus are combined;

generating a header of said network protocol storing a bearer identifier, in said extension area of a first bearer, for each user data, transmitting the user data included in the combined data and designating said gateway apparatus as a destination, and further, the header of said network protocol storing, in a first extension area as said extension area, the bearer identifier is changed to a header of said network protocol storing, in a second extension area as said extension area instead of the first extension area, a bearer identifier of the second bearer, for each user data, transmitting user data included in the combined data and designating said second network as a destination; and transmitting the packet of the combined data having said header to be changed in the extension area and added thereto from said first network apparatus to said gateway apparatus.

11. A data transfer method, in a system comprising a gateway apparatus that connects a first network and a second network in which packets including user data are transmitted by a network protocol, for transferring the user data from a first bearer that is set for each mobile station apparatus by a tunneling protocol in higher layer than said network protocol between the gateway apparatus and a first network apparatus in said first network, to a second bearer that is set for each mobile station apparatus by said tunneling protocol between said gateway apparatus and a second network apparatus in said second network, said data transfer method comprising:

including, in each said packet, an extension area which extends from the header of the packet;

receiving, via said first network, a packet of combined data of different user data in which a plurality of encapsulated different user data encapsulated in accordance with said tunneling protocol are combined and to which a header of said network protocol storing the bearer identifier of said first bearer transmitting the user data included in the combined data is added;

acquiring the bearer identifier of said first bearer from said header;

identifying said second network apparatus based on source information of said packet and the bearer identifier of said first bearer;

specifying an identifier of said second bearer transmitting said user data based on the source information of said packet and the bearer identifier of said first bearer;

regenerating a packet of the combined data in which the plurality of said encapsulated user data are combined and to which a header of said network protocol storing the bearer identifier of said second bearer transmitting user data included in the combined data is added, and further, the packet is regenerated by changing, in a first extension area as said extension area, the header of said network protocol storing the bearer identifier of said first bearer, for each user data, transmitting user data included in the combined data and designating said gateway apparatus as a destination, to a header of said network protocol storing, in a second extension area as said extension area instead of the first extension area, a bearer identifier of said second bearer, for each user data, transmitting user data included in the combined data and designating said second network apparatus as a destination; and transmitting said regenerated packet from said gateway apparatus to said second network apparatus.

* * * * *